(12) United States Patent
Crabtree et al.

(10) Patent No.: US 12,536,593 B2
(45) Date of Patent: Jan. 27, 2026

(54) RISK QUANTIFICATION FOR INSURANCE PROCESS MANAGEMENT EMPLOYING AN ADVANCED INSURANCE MANAGEMENT AND DECISION PLATFORM

(71) Applicant: QOMPLX LLC, Reston, VA (US)

(72) Inventors: Jason Crabtree, Vienna, VA (US); Andrew Sellers, Monument, CO (US)

(73) Assignee: QOMPLX LLC, Reston, VA (US)

( * ) Notice: Subject to any disclaimer, the term of this patent is extended or adjusted under 35 U.S.C. 154(b) by 999 days.

(21) Appl. No.: 17/391,054

(22) Filed: Aug. 2, 2021

(65) Prior Publication Data
US 2022/0058747 A1 Feb. 24, 2022

Related U.S. Application Data

(63) Continuation-in-part of application No. 15/343,209, filed on Nov. 4, 2016, now Pat. No. 11,087,403,
(Continued)

(51) Int. Cl.
*G06Q 40/08* (2012.01)
*G06F 30/20* (2020.01)

(52) U.S. Cl.
CPC ............. *G06Q 40/08* (2013.01); *G06F 30/20* (2020.01)

(58) Field of Classification Search
None
See application file for complete search history.

(56) References Cited

U.S. PATENT DOCUMENTS 5,669,000 A * 9/1997 Jessen ................. G06F 11/3672
717/134
6,256,544 B1 * 7/2001 Weissinger ........ G05B 19/0421
700/1
(Continued)

FOREIGN PATENT DOCUMENTS

CN 105302532 B 6/2018
WO 2014159150 A1 10/2014
(Continued)

*Primary Examiner* — Matthew S Gart
*Assistant Examiner* — Tony P Kanaan
(74) *Attorney, Agent, or Firm* — Galvin Patent Law LLC; Brian R Galvin

(57) ABSTRACT

A system for insurance process management employing an advanced insurance management platform has been developed. A high speed data retrieval and storage module retrieves insurance related data from a plurality of sources. A data analysis module determines an activeness metric for an object, such as a physical asset, in order to categorize risk and also receives a plurality of individual, entity, and object data to create one or more cognitive maps which may analyzed to determine a propensity for risk. The data analysis module generates a cognitive density metric based on the activeness metric and cognitive map. A predictive analytics module performs predictive analytics functions on normalized insurance related data and using the cognitive density metric. A predictive simulation module performs predictive simulation functions on normalized insurance related data. As a result, the system can produce various models to determine risk and loss associated with an insured physical asset.

12 Claims, 15 Drawing Sheets

Related U.S. Application Data which is a continuation-in-part of application No. 15/237,625, filed on Aug. 15, 2016, now Pat. No. 10,248,910, and a continuation-in-part of application No. 15/229,476, filed on Aug. 5, 2016, now Pat. No. 10,454,791, said application No. 15/237,625 is a continuation-in-part of application No. 15/206,195, filed on Jul. 8, 2016, now abandoned, said application No. 15/229,476 is a continuation-in-part of application No. 15/206,195, filed on Jul. 8, 2016, now abandoned, which is a continuation-in-part of application No. 15/186,453, filed on Jun. 18, 2016, now abandoned, which is a continuation-in-part of application No. 15/166,158, filed on May 26, 2016, now abandoned, which is a continuation-in-part of application No. 15/141,752, filed on Apr. 28, 2016, now Pat. No. 10,860,962, which is a continuation-in-part of application No. 15/091,563, filed on Apr. 5, 2016, now Pat. No. 10,204,147, and a continuation-in-part of application No. 14/986,536, filed on Dec. 31, 2015, now Pat. No. 10,210,255, and a continuation-in-part of application No. 14/925,974, filed on Oct. 28, 2015, now abandoned.

(56) References Cited

U.S. PATENT DOCUMENTS

| | | | | |
|---|---|---|---|---|
| 6,477,572 B1* | | 11/2002 | Elderton | H04L 41/0893 709/224 |
| 7,072,863 B1* | | 7/2006 | Phillips | G06Q 40/00 703/2 |
| 7,610,210 B2* | | 10/2009 | Helitzer | G06Q 40/08 705/1.1 |
| 7,657,406 B2* | | 2/2010 | Tolone | G06F 30/20 703/22 |
| 7,698,213 B2* | | 4/2010 | Lancaster | G06Q 40/03 705/38 |
| 7,739,653 B2* | | 6/2010 | Venolia | G06F 16/9038 717/101 |
| 8,065,257 B2* | | 11/2011 | Kuecuekyan | G06N 5/022 706/45 |
| 8,145,761 B2 | | 3/2012 | Liu et al. | |
| 8,281,121 B2* | | 10/2012 | Nath | H04L 9/008 713/150 |
| 8,615,800 B2* | | 12/2013 | Baddour | H04L 63/1441 713/188 |
| 8,694,339 B1* | | 4/2014 | Bunick | G06Q 40/08 700/32 |
| 8,788,306 B2* | | 7/2014 | Delurgio | G06Q 10/063 705/7.11 |
| 8,793,758 B2* | | 7/2014 | Raleigh | H04L 63/10 455/414.1 |
| 8,914,878 B2* | | 12/2014 | Burns | H04L 63/14 726/13 |
| 8,997,233 B2 | | 3/2015 | Green et al. | |
| 9,134,966 B2 | | 9/2015 | Brock et al. | |
| 9,141,360 B1* | | 9/2015 | Chen | G06F 8/52 |
| 9,231,962 B1* | | 1/2016 | Yen | H04L 63/1425 |
| 9,602,530 B2 | | 3/2017 | Ellis et al. | |
| 9,654,495 B2* | | 5/2017 | Hubbard | H04L 63/145 |
| 9,672,355 B2* | | 6/2017 | Titonis | H04W 12/12 |
| 9,686,308 B1* | | 6/2017 | Srivastava | H04L 51/212 |
| 9,762,443 B2* | | 9/2017 | Dickey | H04L 41/046 |
| 9,887,933 B2* | | 2/2018 | Lawrence, III | G06F 16/951 |
| 9,892,463 B1* | | 2/2018 | Hakimi-Boushehri | G16Y 10/50 |
| 9,946,517 B2 | | 4/2018 | Talby et al. | |
| 10,032,224 B2* | | 7/2018 | Helitzer | G16Z 99/00 |
| 10,061,635 B2 | | 8/2018 | Ellwein | |
| 10,102,480 B2 | | 10/2018 | Dirac et al. | |
| 10,185,999 B1* | | 1/2019 | Konrardy | G06Q 40/08 |
| 10,210,246 B2* | | 2/2019 | Stojanovic | G06Q 30/02 |
| 10,210,255 B2 | | 2/2019 | Crabtree et al. | |
| 10,223,751 B1* | | 3/2019 | Hutchinson | G06Q 40/08 |
| 10,242,406 B2* | | 3/2019 | Kumar | G06F 16/00 |
| 10,248,910 B2 | | 4/2019 | Crabtree et al. | |
| 10,318,882 B2 | | 6/2019 | Brueckner et al. | |
| 10,319,039 B1* | | 6/2019 | Konrardy | G06Q 40/08 |
| 10,367,829 B2 | | 7/2019 | Huang et al. | |
| 10,511,498 B1* | | 12/2019 | Narayan | H04L 63/1425 |
| 11,062,393 B2* | | 7/2021 | Ritz | G06Q 40/08 |
| 11,087,403 B2* | | 8/2021 | Crabtree | G06Q 40/08 |
| 12,033,092 B2* | | 7/2024 | Cella | G06Q 50/04 |
| 2003/0041254 A1* | | 2/2003 | Challener | G06F 21/575 713/193 |
| 2003/0145225 A1* | | 7/2003 | Bruton, III | H04L 63/1408 726/23 |
| 2005/0144114 A1* | | 6/2005 | Ruggieri | G06Q 40/04 705/37 |
| 2005/0289072 A1* | | 12/2005 | Sabharwal | G06F 21/121 705/59 |
| 2006/0149501 A1* | | 7/2006 | Tsalakopoulos | G06Q 40/08 702/179 |
| 2006/0149575 A1* | | 7/2006 | Varadarajan | G06Q 10/06 705/7.39 |
| 2007/0016542 A1* | | 1/2007 | Rosauer | G06Q 10/067 706/21 |
| 2007/0150744 A1* | | 6/2007 | Cheng | G06F 21/335 713/183 |
| 2009/0064088 A1* | | 3/2009 | Barcia | G06F 11/3636 717/102 |
| 2009/0089227 A1* | | 4/2009 | Sturrock | G06N 20/10 706/50 |
| 2009/0182672 A1* | | 7/2009 | Doyle | G06F 21/64 705/64 |
| 2009/0222562 A1* | | 9/2009 | Liu | H04L 67/1025 709/226 |
| 2009/0293128 A1* | | 11/2009 | Lippmann | H04L 63/1433 707/999.1 |
| 2011/0060821 A1* | | 3/2011 | Loizeaux | G06Q 10/10 709/224 |
| 2011/0087888 A1* | | 4/2011 | Rennie | G06F 21/41 713/182 |
| 2011/0154341 A1* | | 6/2011 | Pueyo | G06F 9/5066 718/101 |
| 2011/0161119 A1* | | 6/2011 | Collins | G06Q 40/08 705/4 |
| 2012/0266244 A1* | | 10/2012 | Green | H04L 63/145 726/24 |
| 2013/0073062 A1* | | 3/2013 | Smith | G06Q 10/067 700/32 |
| 2013/0132149 A1* | | 5/2013 | Wei | G05B 23/02 340/3.1 |
| 2013/0191416 A1* | | 7/2013 | Lee | G06F 16/2457 707/771 |
| 2013/0226624 A1* | | 8/2013 | Blessman | H04N 7/181 705/4 |
| 2013/0246996 A1* | | 9/2013 | Duggal | G06F 8/35 717/104 |
| 2013/0304623 A1* | | 11/2013 | Kumar | G06Q 40/04 705/37 |
| 2014/0074826 A1* | | 3/2014 | Cooper | G06F 40/30 707/722 |
| 2014/0156806 A1* | | 6/2014 | Karpistsenko | G06Q 10/06 709/219 |
| 2014/0244612 A1* | | 8/2014 | Bhasin | G06Q 50/01 707/706 |
| 2014/0257592 A1* | | 9/2014 | Fernandes | B60W 40/09 701/1 |
| 2014/0279762 A1* | | 9/2014 | Xaypanya | H04L 41/0659 706/12 |
| 2015/0025917 A1* | | 1/2015 | Stempora | G02B 27/0093 705/4 |
| 2015/0095303 A1* | | 4/2015 | Sonmez | G06N 5/01 707/707 |
| 2015/0149979 A1* | | 5/2015 | Talby | G06F 8/35 717/104 |

(56) References Cited

U.S. PATENT DOCUMENTS

| | | | | |
|---|---|---|---|---|
| 2015/0161738 A1* | 6/2015 | Stempora | G06Q 40/08 | 705/4 |
| 2015/0163242 A1* | 6/2015 | Laidlaw | H04L 63/1425 | 726/22 |
| 2015/0169294 A1* | 6/2015 | Brock | G06F 8/42 | 717/164 |
| 2015/0195192 A1* | 7/2015 | Vasseur | H04L 41/0836 | 714/47.3 |
| 2015/0236935 A1* | 8/2015 | Bassett | H04L 43/18 | 709/224 |
| 2015/0281225 A1* | 10/2015 | Schoen | H04L 63/08 | 726/9 |
| 2015/0317481 A1* | 11/2015 | Gardner | G06F 21/57 | 726/2 |
| 2015/0339263 A1* | 11/2015 | Abu El Ata | G06F 17/10 | 703/2 |
| 2015/0347414 A1* | 12/2015 | Xiao | G06F 16/951 | 707/749 |
| 2015/0379424 A1* | 12/2015 | Dirac | G06N 20/00 | 706/12 |
| 2016/0004858 A1* | 1/2016 | Chen | G06F 21/10 | 726/17 |
| 2016/0028758 A1* | 1/2016 | Ellis | H04L 63/1441 | 726/25 |
| 2016/0072845 A1* | 3/2016 | Chiviendacz | G06Q 20/341 | 726/1 |
| 2016/0078361 A1* | 3/2016 | Brueckner | H04L 67/10 | 706/12 |
| 2016/0099960 A1* | 4/2016 | Gerritz | H04L 63/1433 | 726/23 |
| 2016/0105454 A1* | 4/2016 | Li | H04L 63/1416 | 726/23 |
| 2016/0140519 A1* | 5/2016 | Trepca | G06N 7/01 | 705/26.44 |
| 2016/0275123 A1* | 9/2016 | Lin | G06F 9/5083 | |
| 2016/0285732 A1* | 9/2016 | Brech | G06Q 10/06313 | |
| 2016/0342606 A1* | 11/2016 | Le Mouel | G06F 16/2458 | |
| 2016/0350442 A1* | 12/2016 | Crosby | G06F 16/2358 | |
| 2016/0364307 A1* | 12/2016 | Garg | G06F 11/2273 | |
| 2017/0019678 A1* | 1/2017 | Kim | H04N 19/50 | |
| 2017/0063896 A1* | 3/2017 | Muddu | H04L 63/1433 | |
| 2017/0083380 A1* | 3/2017 | Bishop | G06F 9/5083 | |
| 2017/0126712 A1* | 5/2017 | Crabtree | H04L 63/1425 | |
| 2017/0139763 A1* | 5/2017 | Ellwein | H04L 12/2867 | |
| 2017/0149802 A1* | 5/2017 | Huang | G06F 21/577 | |
| 2017/0161614 A1* | 6/2017 | Mehta | G06N 20/00 | |
| 2017/0193110 A1* | 7/2017 | Crabtree | H04L 67/02 | |
| 2017/0206360 A1* | 7/2017 | Brucker | G06F 21/577 | |
| 2017/0322959 A1* | 11/2017 | Tidwell | G06Q 10/10 | |
| 2017/0323089 A1* | 11/2017 | Duggal | G06F 21/335 | |
| 2018/0197128 A1* | 7/2018 | Carstens | G06F 16/9024 | |
| 2018/0300930 A1* | 10/2018 | Kennedy | A63F 13/355 | |
| 2019/0082305 A1* | 3/2019 | Proctor | H04L 63/065 | |
| 2019/0095533 A1* | 3/2019 | Levine | G06F 16/901 | |
| 2019/0156234 A1* | 5/2019 | Mildenhall | G06F 17/141 | |
| 2020/0134733 A1* | 4/2020 | Maddox | G06Q 40/08 | |
| 2021/0192629 A1* | 6/2021 | Tofte | G06V 10/42 | |

FOREIGN PATENT DOCUMENTS

| | | | | |
|---|---|---|---|---|
| WO | 2017075543 A1 | 5/2017 | | |
| WO | WO-2017148161 A1 * | 9/2017 | | G06Q 40/08 |
| WO | WO-2019084061 A1 * | 5/2019 | | G06Q 40/08 |

* cited by examiner

RISK QUANTIFICATION FOR INSURANCE PROCESS MANAGEMENT EMPLOYING AN ADVANCED INSURANCE MANAGEMENT AND DECISION PLATFORM

CROSS-REFERENCE TO RELATED APPLICATIONS

Priority is claimed in the application data sheet to the following patents or patent applications, the entire written description, including figures, of each of which is expressly incorporated herein by reference in its entirety:
Ser. No. 15/343,209
Ser. No. 15/237,625
Ser. No. 15/206,195
Ser. No. 15/186,453
Ser. No. 15/166,158
Ser. No. 15/141,752
Ser. No. 15/091,563
Ser. No. 14/986,536
Ser. No. 14/925,974
Ser. No. 15/229,476
Ser. No. 15/206,195

BACKGROUND OF THE INVENTION

Field of the Invention

The present invention is in the field of use of computer systems in business information management, operations and predictive planning. Specifically, the use of an advanced decision system to provide ongoing risk and peril quantification for insurance business operations.

Discussion of the State of the Art

Insurance as a business field would certainly be characterized as highly reliant on the acquisition and analysis of information. Each client, possibly each policy, relies on the capture, cleaning, normalization and analysis of data pertaining to the client's specific assets, to the plurality of risk factors present at the site or sites where those assets reside, the various perils encountered during occupation of client infrastructure and the operation of client equipment, possible geo-political factors need to be accounted for. These few examples added to others known to those skilled in the art results in a nearly overwhelming influx of information to process and extract, information necessary to intelligently write insurance policies and set premium pricing. The insurance industry is most certainly one where the participants that can gather and intelligently process information to the point where reliable predictions can be made are those that fend best and survive.

There have been several recent developments in business software that have arisen with the purpose of streamlining or automating either business data analysis or business decision process which might be harnessed to aid in insurance business operations of policy writing, capital reserve calculation and premium pricing. PLANATIR™ offers software to isolate patterns in large volumes of data, DATA-BRICKS™ offers custom analytics services, ANAPLAN™ offers financial impact calculation services. There are other software sources that mitigate some aspect of business data relevancy identification in isolation, but these fail to holistically address the entire scope of insurance data analysis. Analysis of that data and business decision automation, however, remains out their reach. Currently, none of these solutions handle more than a single aspect of the whole task, cannot form predictive analytic data transformations and, therefore, are of little use in the area of insurance practices, where the only solution is a very complex process requiring sophisticated integration of the tools above.

While the ability to retrieve large amounts of data has greatly increased and there are packages that purport to aid actuaries and underwriters assess risk they only serve to add to the overload of information described above, and to be of optimal use, must be carefully analyzed by any business information management system purporting to provide reliable insurance relevant prediction capability and quantifiable decision support.

What is needed is a fully integrated system that retrieves risk, insurance market and capital relevant information from many heterogeneous sources using a scalable, expressively scriptable, connection interface, identifies and analyzes that high volume data, transforming it into a useful format after automatically finding hidden patterns in the data. Such a system must then use that data to drive an integrated, highly scalable simulation engine which may employ combinations of the system dynamics, discrete event and agent based paradigms within a simulation run such that the most useful and accurate data transformations are obtained and stored for the human analysts such as actuaries, underwriters and financial officers to rapidly digest the presented information, readily comprehend any predictions or recommendations and then creatively respond to optimize client insurance coverage and insurer business interests including profit. This multimethod information insurance risk and coverage information capture, analysis, transformation, outcome prediction, and presentation system forming a "business operating system."

SUMMARY OF THE INVENTION

Accordingly, the inventor has developed a system for risk quantification for insurance process management employing an advanced cyber-decision platform. In a typical embodiment, the advanced cyber decision platform, a specifically programmed usage of the business operating system, continuously retrieves data related to asset worth, environmental conditions such as but not limited to weather, fire danger, flood danger, and regional seismic activity, infrastructure and equipment integrity through available remote sensors, geo-political developments where appropriate and other appropriate client specific data. Of note, this information can be well-structured, highly schematized for automated processing (e.g. relational data), have some structure to aid automated processing, or be purely qualitative (e.g. human readable natural language) without a loss of generality. The system then uses this information for two purposes: First, the advanced computational analytics and simulation capabilities of the system are used to provide immediate disclosure of a presence of immanent peril and recommendations are given on that should be made to harden the affected assets prior to or during the incident. Second, new data is added to any existing data to update risk models for further analytic and simulation transformation used to recommend insurance coverage requirements and actuarial/underwriting tables for each monitored client. Updated results may be displayed in a plurality of formats to best illustrate the point to be made and that display perspective changed as needed by those running the analyses. The ability of the business operating system to capture, clean, and normalize data then to perform advanced predictive analytic functions and predictive simulations, alerting decision makers of deviations found from established normal operations, possibly providing recommendations in addition to analyzing all relevant asset and risk data to possibly provide premium costing and capital reserve values for each client, on a semi-continuous basis, if desired, frees decision makers in the insurer's employ to creatively employ the processed, analyzed data to increase client security and safety and to predominantly manage by exception.

According to a preferred embodiment of the invention, a system for risk quantification for insurance process management employing an advanced insurance management and decision platform has been devised and reduced to practice, the invention comprising: a high-speed data retrieval and storage module stored in a memory of and operating on a processor of a computing device and configured to: retrieve a plurality of insurance contract underwriting terms pertaining to a physical asset; identify a plurality of risks associated with the physical asset based on the plurality of underwriting terms; identify a magnitude of each of the plurality of identified risks associated with the physical asset; and identify an upcoming risk event in the geographical location of the physical asset; and a data analysis module stored in a memory of and operating on a processor of a computing device and configured to: receive a plurality of first senor data pertaining to the physical asset and a plurality of second sensor data pertaining to one or more individuals; extract location data pertaining to the physical asset from the plurality of first sensor data; analyze the plurality first sensor data to determine a activeness metric of the physical asset; retrieve an individual profile associated with the one or more individuals; create a cognitive map based at least on the plurality of second sensor data and the individual profile wherein the cognitive map comprises one or more risk-related decision making processes; assign a risk propensity score using the one or more specific risk-related decision making processes; combine the activeness metric and the risk-propensity score based on the location data to produce a cognitive density metric associated with the physical asset or the location of the physical asset; and send the cognitive density metric to a predictive analytics module; and a predictive analytics module stored in a memory of and operating on a processor of a computing device and configured to: receive the cognitive density metric; generate a vulnerability model that relates the insurance contract underwriting terms, the magnitude of the plurality of risks, and the cognitive density metric to determine a risk response of the physical assets to the plurality of risks; and apply the upcoming risk event to the determined risk response to predict a loss associated with the physical asset; and a predictive simulation module stored in a memory of and operating on a processor of a computing device and configured to: generate a blended exposures and losses model configured to analyze concentration of losses in terms of time, location, and cognitive density; generate synthetic data based on the magnitude of each of the plurality of risks and the predicted loss associated with the physical asset; and pass the synthetic data through the blended exposures and losses model to determine a concentrated risk of loss associated with a plurality of assets of the same type as the physical asset.

According to a preferred embodiment of the invention, a method for risk quantification for insurance process management employing an advanced insurance management and decision platform comprising the steps of: retrieving a plurality of insurance contract underwriting terms pertaining to a physical asset; identifying a plurality of risks associated with the physical asset based on the plurality of underwriting terms; identifying a magnitude of each of the plurality of identified risks associated with the physical asset; identifying an upcoming risk event in the geographical location of the physical asset; receiving a plurality of first senor data pertaining to the physical asset and a plurality of second sensor data pertaining to one or more individuals; extracting location data pertaining to the physical asset from the plurality of first sensor data analyzing the plurality first sensor data to determine a activeness metric of the physical asset; retrieving an individual profile associated with the one or more individuals; creating a cognitive map based at least on the plurality of second sensor data and the individual profile wherein the cognitive map comprises one or more risk-related decision making processes; assigning a risk propensity score using the one or more specific risk-related decision making processes; combining the activeness metric and the risk-propensity score based on the location data to produce a cognitive density metric associated with the physical asset or the location of the physical asset; sending the cognitive density metric to a predictive analytics module; receiving the cognitive density metric; generating a vulnerability model that relates the insurance contract underwriting terms, the magnitude of the plurality of risks, and the cognitive density metric to determine a risk response of the physical assets to the plurality of risks; applying the upcoming risk event to the determined risk response to predict a loss associated with the physical asset; generating a blended exposures and losses model configured to analyze concentration of losses in terms of time, location, and cognitive density; generating synthetic data based on the magnitude of each of the plurality of risks and the predicted loss associated with the physical asset; and passing the synthetic data through the blended exposures and losses model to determine a concentrated risk of loss associated with a plurality of assets of the same type as the physical asset.

BRIEF DESCRIPTION OF THE DRAWING FIGURES

The accompanying drawings illustrate several embodiments of the invention and, together with the description, serve to explain the principles of the invention according to the embodiments. One skilled in the art will recognize that the particular embodiments illustrated in the drawings are merely exemplary, and are not intended to limit the scope of the present invention.

DETAILED DESCRIPTION

Figure 1:
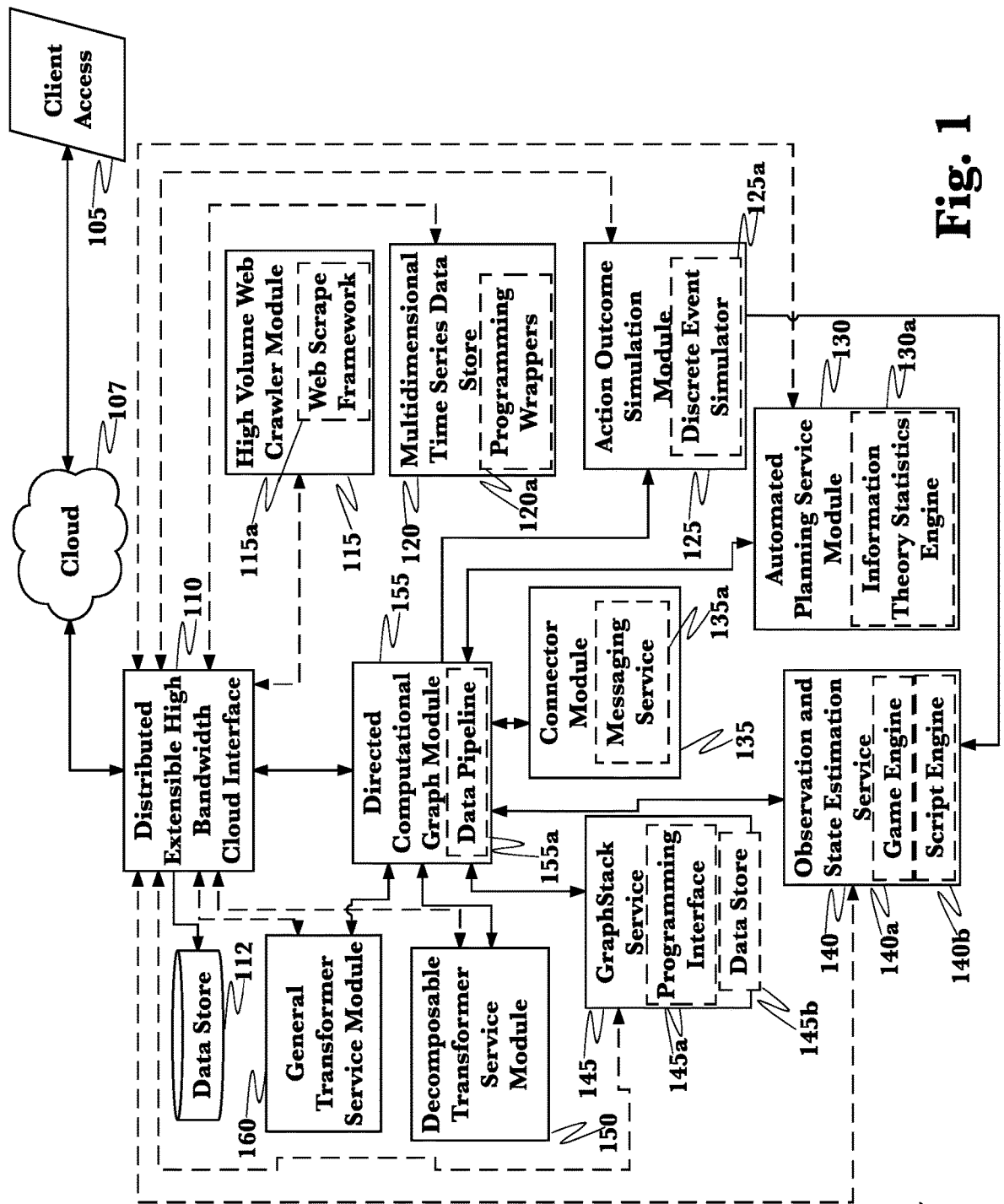
FIG. 1 is a diagram of an exemplary architecture of a business operating system according to an embodiment of the invention.

The inventor has conceived, and reduced to practice, a system for insurance process management employing an advanced insurance management platform. A high speed data retrieval and storage module retrieves insurance related data from a plurality of sources. A data analysis module determines an activeness metric for an object, such as a physical asset, in order to categorize risk and also receives a plurality of individual, entity, and object data to create one or more cognitive maps which may analyzed to determine a propensity for risk. The data analysis module generates a cognitive density metric based on the activeness metric and cognitive map. A predictive analytics module performs predictive analytics functions on normalized insurance related data and using the cognitive density metric. A predictive simulation module performs predictive simulation functions on normalized insurance related data. As a result, the system can produce various models to determine risk and loss associated with an insured physical asset.

Part of the system can include a deployment of various sensors which seek to measure the activeness of objects, and other sensors that can monitor the behavior of objects. The data gathered from the activeness sensors may be passed through an activeness engine which can transform the data as necessary and then output various activeness metrics associated with the object. As more data is collected from many objects, the activeness data can be used to overlay onto a geographical map which can create a sort of population density around the monitored objects. Information gathered from the other sensors, which are collecting behavior data of objects, may be used in conjunction with the activeness map to identify locations where activeness is high and where object behavior sensor data is sufficient and/or insufficient.

Additionally, there may be cognitive engine which uses a plurality of sensor data and individual profile data to create a cognitive map of the individual. Individual profile data may include, but is not limited to, name, age, gender, address, policy information, risk assessment, activeness metric(s), assets owned and/or insured/underwritten, questionnaire and/or survey responses, owned mobile devices (e.g., cell phone, smart wearable), social media data, sensor data (e.g., data gathered from a personal mobile device, from a smart wearable device, activeness data device, etc.), health record data, cognitive data and the like. Individual profile data may be gathered from a plurality of sources including, but not limited to, social media accounts (e.g., posts, comments, likes/dislikes, subscriptions, etc.), user-provided data (e.g., such as during initial user account set up or subsequent account interactions, user-submitted responses to questionnaires/surveys, etc.) and the like. In some embodiments, individual profile data may be derived and/or inferred via data and/or behavioral analysis. For example, if an individual is a member of several rock climbing groups on social media, and also often posts pictures on social media of them skydiving, then the system, such as via the mapping engine, may infer that the individual is a risk-taker or not risk-averse and this inferred information may be included in the cognitive map of the individual.

The cognitive map of an individual can be used in combination with the activeness data of an object and/or individual to identify locations/situations where an individual may be more at risk of injury/loss due to the activeness associated with the object/individual and the cognitive ability of the individual or group of individuals interacting with a location/situation. This combination of the activeness metric and the cognitive map can result in a new metric: the cognitive density metric. Predictive analytics may be used to determine which risk events are most likely to occur affect an object (e.g., person, physical asset) or a location. The identified risk events may then be included with cognitive density metric as inputs into a simulation module which can be leveraged to determine risk event decisions and outcomes. The simulation inputs and risk event decisions and outcomes may be used to create a hazard model which takes into account the associated risk of the activeness metric, the associated risk of the cognitive abilities of affected individuals during various risk events, and the physical and/or financial loss risk associated with the risk event to determine a comprehensive and detailed risk score for the object.

In some embodiments, activeness may be related to "people/vehicle/item density", and/or "interaction/distraction", and/or other factors, components, or parameters which are discussed herein. The "people/vehicle/item density" (or crowdedness) component may be indicative of the number of people, vehicles, items, objects, equipment, devices, or the like, at a given location or area at a given point in time (which may be viewed as a static parameter). A dynamic aspect of "people/vehicle/item density" component may be the movement of (or change in number of) people, vehicles, items, objects, equipment, devices, or the like, passing through, by, or near, a given location or area over a given period of time, which may also be referred to as a "traffic/throughput" activeness component (which may be viewed as the rate of change (or derivative) of the "people/vehicle/item density" component).

"People/vehicle/item density" activeness may, for example, according to some embodiments, be descriptive of how many people/vehicles/items occupy an area independent of whether or not they interact with each other or are distracted by each other.

It may be beneficial, for example, for an insurance policy on an automobile to be structured to take into account the activeness of specific roads on which a driver of the automobile frequently travels (e.g., take into account activeness of objects other than those being insured). While standard automobile insurance policies are written to take into account the added risk associated with each generic mile driven by an automobile (e.g., it is known that insurance premiums may be at least partially based on how many miles are driven by the automobile on an annual basis), no measure of the activeness of other related objects (such as the road, i.e., how many other cars are on the road at the same time) associated with the policy are taken into account.

One or more different inventions may be described in the present application. Further, for one or more of the inventions described herein, numerous alternative embodiments may be described; it should be understood that these are presented for illustrative purposes only. The described embodiments are not intended to be limiting in any sense. One or more of the inventions may be widely applicable to numerous embodiments, as is readily apparent from the disclosure. In general, embodiments are described in sufficient detail to enable those skilled in the art to practice one or more of the inventions, and it is to be understood that other embodiments may be utilized and that structural, logical, software, electrical and other changes may be made without departing from the scope of the particular inventions. Accordingly, those skilled in the art will recognize that one or more of the inventions may be practiced with various modifications and alterations. Particular features of one or more of the inventions may be described with reference to one or more particular embodiments or figures that form a part of the present disclosure, and in which are shown, by way of illustration, specific embodiments of one or more of the inventions. It should be understood, however, that such features are not limited to usage in the one or more particular embodiments or figures with reference to which they are described. The present disclosure is neither a literal description of all embodiments of one or more of the inventions nor a listing of features of one or more of the inventions that must be present in all embodiments.

Headings of sections provided in this patent application and the title of this patent application are for convenience only, and are not to be taken as limiting the disclosure in any way.

Devices that are in communication with each other need not be in continuous communication with each other, unless expressly specified otherwise. In addition, devices that are in communication with each other may communicate directly or indirectly through one or more intermediaries, logical or physical.

A description of an embodiment with several components in communication with each other does not imply that all such components are required. To the contrary, a variety of optional components may be described to illustrate a wide variety of possible embodiments of one or more of the inventions and in order to more fully illustrate one or more aspects of the inventions. Similarly, although process steps, method steps, algorithms or the like may be described in a sequential order, such processes, methods and algorithms may generally be configured to work in alternate orders, unless specifically stated to the contrary. In other words, any sequence or order of steps that may be described in this patent application does not, in and of itself, indicate a requirement that the steps be performed in that order. The steps of described processes may be performed in any order practical. Further, some steps may be performed simultaneously despite being described or implied as occurring sequentially (e.g., because one step is described after the other step). Moreover, the illustration of a process by its depiction in a drawing does not imply that the illustrated process is exclusive of other variations and modifications thereto, does not imply that the illustrated process or any of its steps are necessary to one or more of the invention(s), and does not imply that the illustrated process is preferred. Also, steps are generally described once per embodiment, but this does not mean they must occur once, or that they may only occur once each time a process, method, or algorithm is carried out or executed. Some steps may be omitted in some embodiments or some occurrences, or some steps may be executed more than once in a given embodiment or occurrence.

When a single device or article is described, it will be readily apparent that more than one device or article may be used in place of a single device or article. Similarly, where more than one device or article is described, it will be readily apparent that a single device or article may be used in place of the more than one device or article.

The functionality or the features of a device may be alternatively embodied by one or more other devices that are not explicitly described as having such functionality or features. Thus, other embodiments of one or more of the inventions need not include the device itself.

Techniques and mechanisms described or referenced herein will sometimes be described in singular form for clarity. However, it should be noted that particular embodiments include multiple iterations of a technique or multiple manifestations of a mechanism unless noted otherwise. Process descriptions or blocks in figures should be understood as representing modules, segments, or portions of code which include one or more executable instructions for implementing specific logical functions or steps in the process. Alternate implementations are included within the scope of embodiments of the present invention in which, for example, functions may be executed out of order from that shown or discussed, including substantially concurrently or in reverse order, depending on the functionality involved, as would be understood by those having ordinary skill in the art.

Definitions

As used herein, a "swimlane" is a communication channel between a time series sensor data reception and apportioning device and a data store meant to hold the apportioned data time series sensor data. A swimlane is able to move a specific, finite amount of data between the two devices. For example, a single swimlane might reliably carry and have incorporated into the data store, the data equivalent of 5 seconds worth of data from 10 sensors in 5 seconds, this being its capacity. Attempts to place 5 seconds worth of data received from 6 sensors using one swimlane would result in data loss.

As used herein, a "metaswimlane" is an as-needed logical combination of transfer capacity of two or more real swimlanes that is transparent to the requesting process. Sensor studies where the amount of data received per unit time is expected to be highly heterogeneous over time may be initiated to use metaswimlanes. Using the example used above that a single real swimlane may transfer and incorporate the 5 seconds worth of data of 10 sensors without data loss, the sudden receipt of incoming sensor data from 13 sensors during a 5 second interval would cause the system to create a two swimlane metaswimlane to accommodate the standard 10 sensors of data in one real swimlane and the 3 sensor data overage in the second, transparently added real swimlane, however no changes to the data receipt logic would be needed as the data reception and apportionment device would add the additional real swimlane transparently.

As used herein, the term "activeness" may generally refer to a measure of activity of an object (e.g., how "busy" the object is, e.g., traffic associated with an object, such as foot or vehicle traffic, or how many people or vehicles occupy a given area). The activeness of many different types of objects may, according to some embodiments, be utilized to assess risk and/or calculate insurance premiums. For example, when there are many people (and/or human-controlled vehicles or machines) located in a given area, there is a higher likelihood that they may interfere with, endanger (e.g., bump into), or otherwise affect each other and cause injury or losses, or that any given person/vehicle will be injured/damaged or affected by a hazard in the area, than if there were only a few people and/or vehicles.

As used herein, the term "cognitive map" is a map or catalogue of an individual's cognitive information or data including cognitive capacity, current cognitive load, cognitive skills, cognitive speed, and/or cognitive processes especially as they pertain to making decisions. The cognitive map may comprise cognitive information and the cognitive map may be represented by one or more data sets, one or more arrays of data, one or more databases, or other collection of data stored on a nontransitory computer readable media.

As used herein, "contextual information" refers to data regarding the surroundings, environment, circumstances, background, reasoning, or settings that determine, specify, interpret, or clarify the meaning of an event or other occurrence. In some embodiments, the contextual information directly or indirectly provides information related to the decision-making process. In some embodiments, the contextual information provides supporting information that increases the probability of occurrence, or confirms an occurrence or the conditions of a specific decision or decision-making process. Contextual information can include the conditions surrounding an event such as a decision and can include the physical or mental state of the individual. In some embodiments, historical contextual information may be used to provide decision related information or information that can be used to deduce other decision related information.

Conceptual Architecture

FIG. 1 is a diagram of an exemplary architecture of a business operating system 100 according to an embodiment of the invention. Client access to the system 105 for specific data entry, system control and for interaction with system output such as automated predictive decision making and planning and alternate pathway simulations, occurs through the system's distributed, extensible high bandwidth cloud interface 110 which uses a versatile, robust web application driven interface for both input and display of client-facing information and a data store 112 such as, but not limited to MONGODB™, COUCHDB™, CASSANDRA™ or REDIS™ depending on the embodiment. Much of the business data analyzed by the system both from sources within the confines of the client business, and from cloud based sources 107, public or proprietary such as, but not limited to: subscribed business field specific data services, external remote sensors, subscribed satellite image and data feeds and web sites of interest to business operations both general and field specific, also enter the system through the cloud interface 110, data being passed to the connector module 135 which may possess the API routines 135a needed to accept and convert the external data and then pass the normalized information to other analysis and transformation components of the system, the directed computational graph module 155, high volume web crawler module 115, multidimensional time series database 120 and the graph stack service 145. The directed computational graph module 155 retrieves one or more streams of data from a plurality of sources, which includes, but is not limited to, a plurality of physical sensors, network service providers, web based questionnaires and surveys, monitoring of electronic infrastructure, crowd sourcing campaigns, and human input device information. Within the directed computational graph module 155, data may be split into two identical streams in a specialized pre-programmed data pipeline 155a, wherein one sub-stream may be sent for batch processing and storage while the other sub-stream may be reformatted for transformation pipeline analysis. The data is then transferred to the general transformer service module 160 for linear data transformation as part of analysis or the decomposable transformer service module 150 for branching or iterative transformations that are part of analysis. The directed computational graph module 155 represents all data as directed graphs where the transformations are nodes and the result messages between transformations edges of the graph. The high volume web crawling module 115 uses multiple server hosted preprogrammed web spiders, which while autonomously configured are deployed within a web scraping framework 115a of which SCRAPY™ is an example, to identify and retrieve data of interest from web based sources that are not well tagged by conventional web crawling technology. The multiple dimension time series data store module 120 may receive streaming data from a large plurality of sensors that may be of several different types. The multiple dimension time series data store module may also store any time series data encountered by the system such as but not limited to environmental factors at insured client infrastructure sites, component sensor readings and system logs of all insured client equipment, weather and catastrophic event reports for all regions an insured client occupies, political communiques from regions hosting insured client infrastructure and network service information captures such as, but not limited to news, capital funding opportunities and financial feeds, and sales, market condition and service related customer data. The module is designed to accommodate irregular and high volume surges by dynamically allotting network bandwidth and server processing channels to process the incoming data. Inclusion of programming wrappers for languages examples of which are, but not limited to C++, PERL, PYTHON, and ERLANG™ allows sophisticated programming logic to be added to the default function of the multidimensional time series database 120 without intimate knowledge of the core programming, greatly extending breadth of function. Data retrieved by the multidimensional time series database 120 and the high volume web crawling module 115 may be further analyzed and transformed into task optimized results by the directed computational graph 155 and associated general transformer service 150 and decomposable transformer service 160 modules. Alternately, data from the multidimensional time series database and high volume web crawling modules may be sent, often with scripted cuing information determining important vertexes 145a, to the graph stack service module 145 which, employing standardized protocols for converting streams of information into graph representations of that data, for example, open graph internet technology although the invention is not reliant on any one standard. Through the steps, the graph stack service module 145 represents data in graphical form influenced by any pre-determined scripted modifications 145*a* and stores it in a graph-based data store 145*b* such as GIRAPH™ or a key value pair type data store REDIS™, or RIAK™, among others, all of which are suitable for storing graph-based information.

Results of the transformative analysis process may then be combined with further client directives, additional business rules and practices relevant to the analysis and situational information external to the already available data in the automated planning service module 130 which also runs powerful information theory 130*a* based predictive statistics functions and machine learning algorithms to allow future trends and outcomes to be rapidly forecast based upon the current system derived results and choosing each a plurality of possible business decisions. The using all available data, the automated planning service module 130 may propose business decisions most likely to result is the most favorable business outcome with a usably high level of certainty. Closely related to the automated planning service module in the use of system derived results in conjunction with possible externally supplied additional information in the assistance of end user business decision making, the action outcome simulation module 125 with its discrete event simulator programming module 125*a* coupled with the end user facing observation and state estimation service 140 which is highly scriptable 140*b* as circumstances require and has a game engine 140*a* to more realistically stage possible outcomes of business decisions under consideration, allows business decision makers to investigate the probable outcomes of choosing one pending course of action over another based upon analysis of the current available data.

For example, the Underwriting Department is looking at pricing for a new perspective client who operates tugboats at three locations. The appraising team hired to estimate the company's assets has submitted a total equipment and infrastructure worth of $45,500,00.00. The system 100, from all available data estimates the total equipment and infrastructure worth to be approximately $49,000,000.00 due to significant dock footing improvements made at two of the sites. Analysis of data retrieved by the high volume web crawler module 115 shows that these two sites are in areas highly effected by both wind and storm surge caused by the passing of hurricanes and that two major claims including both infrastructure and vessel damage have been filed in the past 6 years. Graphical analysis 155, 145 of historical hurricane frequency and predictive analytics 130, 130*a* and simulation 125, 125*a* indicate that at least one hurricane event will occur in the next two years and analysis of provided published procedure as well as expenditures show 135 that nothing has been done to further safeguard infrastructure or equipment at either site. Display of these data using a hazard model 140, 140*a* 140*b* predicts a major payout in the next two years leading to a significant net loss at prevailing premium pricing. From these results the insurer's actuaries and underwriters are efficiently alerted to these factors. It is decided to continue with the perspective venture but at a much higher premium rate and with higher capital reserves than originally expected.

Figure 2:
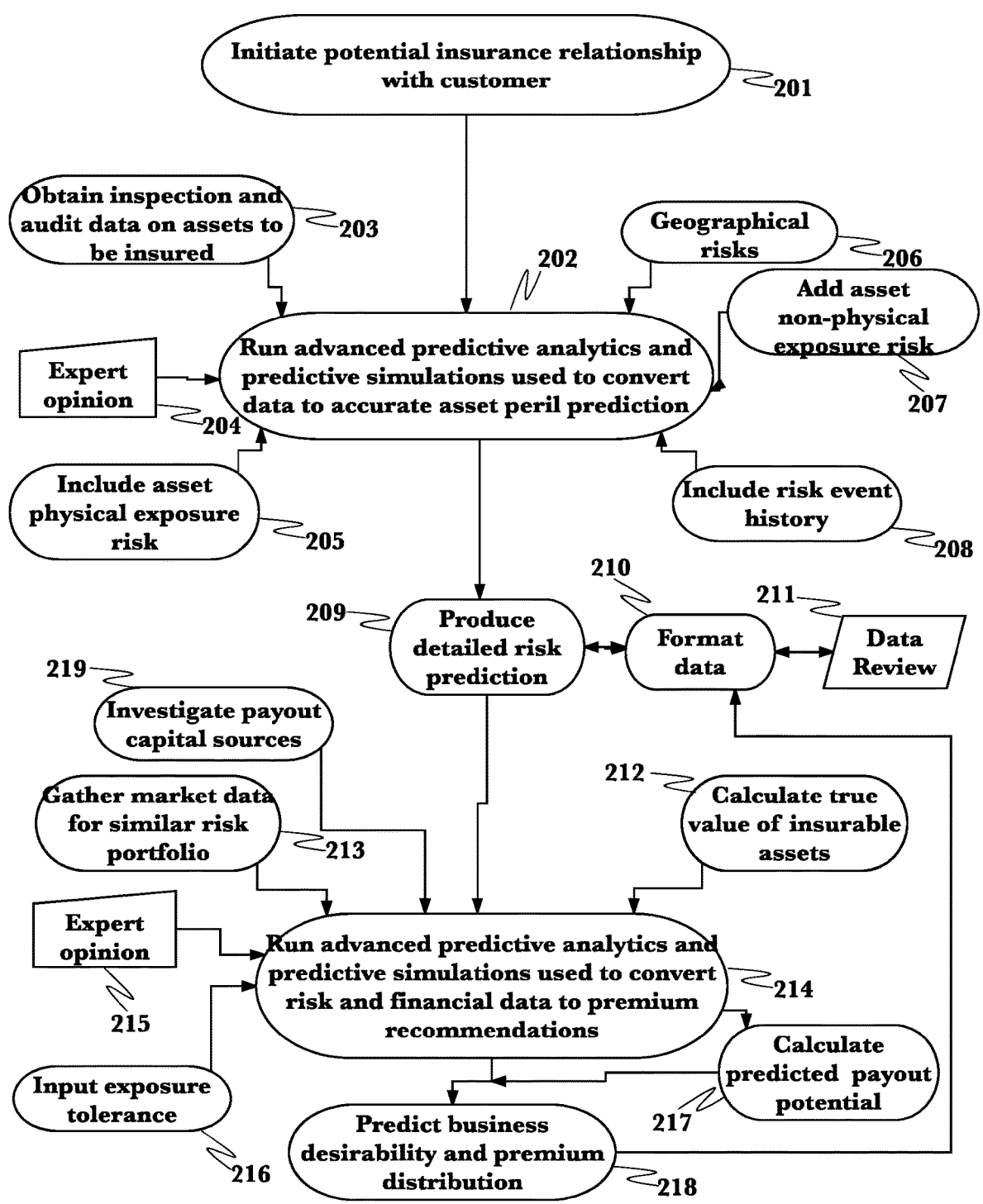
FIG. 2 is a flow diagram of an exemplary function of the business operating system in the calculation of asset hazard and risk in relationship to premium fixation.

FIG. 2 is a flow diagram of an exemplary function of the business operating system in the calculation of asset hazard and risk in relationship to premium fixation 200. In an embodiment, the prospect of a new insurance customer is presented 201. Several pieces of data combine to produce an insurance relationship that optimally serves both customer and insurer. All of this data must be cleanly analyzed not only individually but also as a whole, combined in multiple permutations and with the ability to uncover hard to foresee relationships and future possible pitfalls. The business operating system 100 previously disclosed in co-pending application Ser. No. 15/141,752 and applied in a role of cybersecurity in co-pending application Ser. No. 15/237,625, when programmed to operate as an insurance decision platform, is very well suited to perform advanced predictive analytics and predictive simulations 202 to produce risk predictions required by actuaries and underwriters to generate accurate tables for later pricing. Data forming the basis of these calculations may be drawn from a set comprising at least: inspection and audit data on the condition and worth of the customer's equipment and infrastructure to be insured 203; known and probable physical risks to customer's assets such as but not limited to: flooding, volcanic eruption, wildfires, tornado activity, hurricane or typhoon, earthquake among other similar dangers known to those skilled in the art 205; non-physical risks to customer's assets which may include, but are not limited to: electronic or cyberattack, and defective operating software as well as other similar risks known to those skilled in the field 207; and geographical risks, which may include but are not limited to: political and economic unrest, crime rates, government actions, and escalation of regional tensions 206. Also of great importance may be the actual history of risk events 208 occurring at or near the sites of a customer's assets as such data provides at least some insight into the occurrence and regularity of possible payout requiring events to be analyzed prior to policy generation. For the most complete and thereby accurate use of predictive analytics and predictive simulation 202, the possibility to add expert opinion and experience 204 to the body of data should be available. Important insights into aspects of a potential client may not be present or gleaned by the analysis of the other available data. An observation made by an insurer's expert 204 during the process, even if seemingly minor, may, when analyzed with other available data, give rise to additional queries that must be pursued or significantly change the predictive risk recommendations produced 209 by the insurance decision platform 202.

The generation of detailed risk prediction data 209, which may have granularity to every unit of equipment possessed and each structure as well as support land and services of each area of infrastructure as would be known to those skilled in the field, is of great value on its own and its display 211, possibly in several presentation formats 210 for different insurer groups may be needed, for example as a strong basis for the work of actuaries and underwriters to derive risk cost tables and guides, among multiple other groups who may be known to those skilled in the field. Once expert risk-cost data is determined, it may be input 211, system formatted and cleaned 210 and added to the system generated risk prediction data, along with contributions by other insurer employed groups to the data to be used 209 in predictive calculation of business desirability of insuring the new venture and premium recommendations 214, 218. Some factors that may be retrieved and employed by the system here are: to gather available market data for similar risk portfolios as pricing and insurer financial impact guidelines 213; all available data for all equipment and infrastructure to be insured may also be reanalyzed for accuracy, especially for replacement values which may fluctuate greatly and need to be adjusted intelligently to reflect that 212; the probabilities of multiple disaster payouts or cascading payouts between linked sites as well as other rare events or very rare events must be either predicted or explored and accounted for 217; an honest assessment of insurer company risk exposure tolerance as it is related to the possible customer's specific variables must be considered for intelligent predictive recommendations to be made 216; also potential payout capital sources for the new venture must be investigated be they traditional in nature or alternative such as, but not limited to insurance linked security funds 219; again, the possibility of expert opinion data should be available to the system during analysis and prediction of business desirability recommendations and premiums changed 218. All recommendations may be formatted 210 for specific groups within the insurer company and possibly portions for the perspective client and displayed for review 211.

While all descriptions above present use of the insurance decision platform for new clients, the majority of the above process is also applicable to such tasks as policy renewals or expansions.

Figure 3:
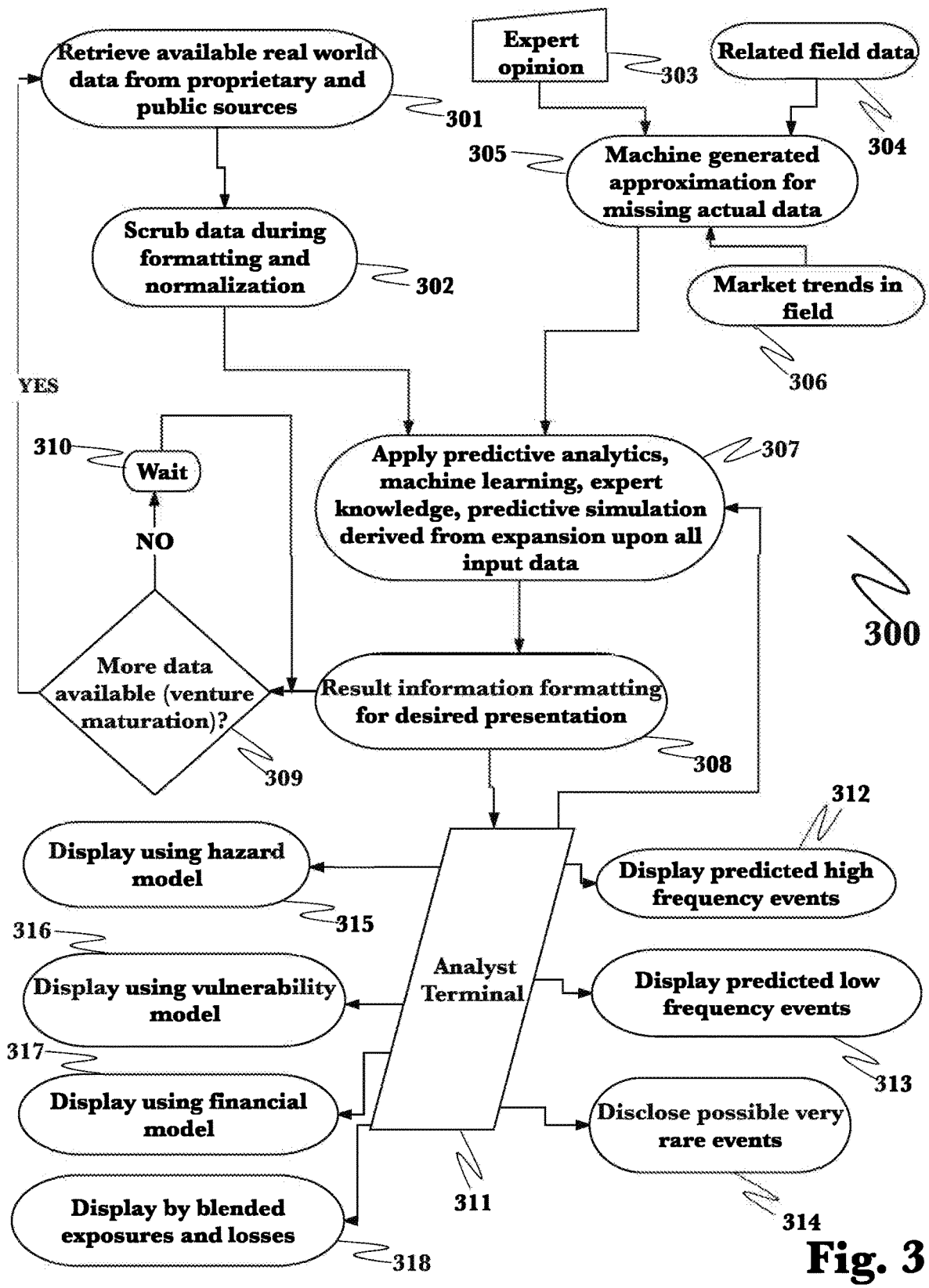
FIG. 3 is a process diagram showing business operating system functions in use to present comprehensive data and estimate driven predictive recommendations in emerging insurance markets using several possible presentation model formats.

FIG. 3 is a process diagram showing business operating system functions in use to present comprehensive data and estimate driven predictive recommendations in emerging insurance markets 300 using several possible presentation model formats. New insurance markets are continuously arising and the ability to profitably participate is of great importance. An embodiment of the invention 100 programmed analyze insurance related data and recommend insurance decisions may greatly assist in development of a profitable pathway in new insurance opportunities. Retrieval or input of any prospective new field related data from a plurality of both public and available private or proprietary sources acts to seed the process 301, specific modules of the system such as the connector module 135 with its programmable messaging service 135*a*, the High volume web crawler 115 and the directed computational graph module 155, among possible others act to scrub format and normalize data 302 from many sources for use. In new fields of possible insurance venture, many pieces of data necessary and useful for the arrival at reliable and informed decision are absent. Some of this can be circumvented by the presence of expert opinion from insurer's employees and outside consultants who may work in the field targeted by the venture 303 much of the rest of the information must be predictively synthesized using such sources as data available from insurance ventures in related fields 304, and market trends in the field 306 among other factors known to those skilled in the field and reliable approximations by the system based upon these factors 305. Actual data and estimates when combined may be further combined and predictively transformed by the insurance decision platform 307 to produce the most reliable model and recommendations possible to be considered by decision makers at the insurer such as actuaries, underwriters, financial officers and brokers to decide 308 on the best path forward without each of them having to have found and processed the data themselves which may have led to omissions and errors. Also, if the venture is pursued, the system may continuously monitor all resulting data such that the model 309, 310, 301 may be continuously improved and both insurer profitability and insurance coverage for the client are best optimized. Results may be formatted for display and manipulation in several different ways, via an analyst terminal 311, a few of which include a hazard model 315 which defines arbitrary characteristics of potential disasters or loss-initiating events and their frequency, location and severity using analytics or modeling simulation. In this display model, single-event characteristics are enhanced with event-set generation tools. A vulnerability model 316 which specify the response of insured assets and areas of interest based on the magnitude of experienced events. This display model blends expert opinion with empirical data and extracted models and can be re-configured to accommodate custom weightings. A financial model 317 which takes into account financial impact across all monitored assets and scenarios with each platform convolution while also considering portfolio-level losses and distributions. This model provides data optimized for making informed business decisions using an expected probability curve and promotes consideration of tools such as the tail value-at-risk to understand exposures to large single-event losses. Finally, a blended exposures and losses model 318 which operates under the knowledge that risks that may result in numerous losses concentrated in space and time are especially challenging. The strong correlation between inland flooding, storm surge and wind damage from hurricanes is a canonical example. This model optimizes the result data for display of multi-peril analysis to improve product development and introduction while balancing concerns related to correlated risk accumulation via modeling and named-peril risk transfer—even on all peril or multi-peril primary insurance products.

In addition to displaying the specifics of a new venture under the differential illumination of the above display models, asset peril may be visualized by predicted occurrence probabilities which range from "high frequency events" 312 which are usually of low and estimable severity per single event, low in peril risk, which is most easily calculated, has an estimable frequency when analytics are used and may follow a Gaussian type 1 distribution; to "low frequency events" 313 which may be of high severity per single event engenders a catastrophic event risk which is calculable and may be at least partially mitigatable, is difficult to estimate in frequency and thus may require both predictive analytic and simulation transformation to determine and follows a type 2 fat-tailed power law distribution; and last events that must be classified as "very rare" 314 which may be extremely severe if they occur possibly forecast by simulation, have an "existential" risk factor which is calculable only in terms of the impact of the event and may only be roughly estimable by input expert judgement, frequency cannot be forecast. Of course display of venture specific events of predicted as "high frequency" and "low frequency" are most likely whereas display of machine simulated "very rare" events are of value to spark further exploration and discussion.

Figure 4:
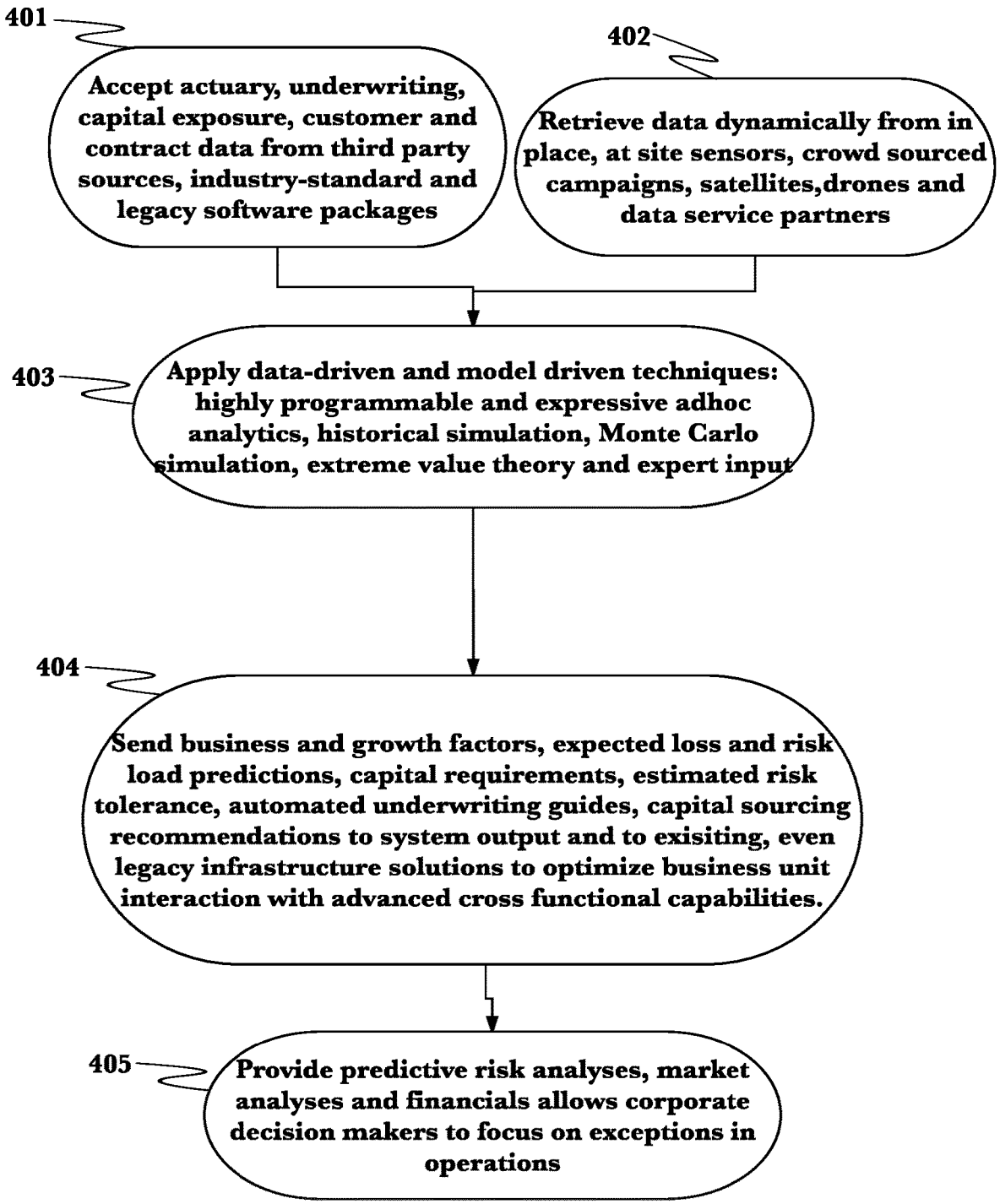
FIG. 4 is a process flow diagram of a possible role in a more generalized insurance workflow as per one embodiment of the invention.

FIG. 4 is a process flow diagram of a possible role in a more generalized insurance workflow 400 as per one embodiment of the invention. It is important that any added computational capability, such as the SaaS insurance decision platform, integrate with the majority, if not all of an insurer's existing workflow while opening the business to new sources of information and predictive capabilities. With its programmable connector module 135 and messaging center 135*a*, the insurance decision platform 100 is pre-designed to retrieve and transform data from the APIs of virtually all industry standard software packages and can be programmed to retrieve information from other legacy or obscure sources as needed, as an example, data may even be entered as csv and transformed, as a simplistic choice from the many possible formats known to one skilled in the art and for which the platform is capable to handle 401. Of greatly added value, the platform may allow the client insurer to receive data dynamically from in-place at site sensors at insurance client sites or in various areas of interest 402 due to the multidimensional time series 120 data store which can be programmed to interpret and correctly normalize many data streams 120*a*. Feeds from crowd sourced campaigns, satellites, drones, sources which may not have been available to the insurer client in the past can also be used as information sources as can a plurality of insurance related data, both on the general web and from data service providers may also add to the full complement of data the insurer client can use for decision making 402. To reliably and usefully process all of this data which can quickly overwhelm even a team dedicated to accumulation and cleansing, the platform may transform and analyze the data with model and data driven algorithms which include but are not limited to ad hoc analytics, historical simulation, Monte Carlo simulation, extreme value theory and processes augmented by insurance expert input 403 as well as other techniques known to be useful in these circumstances by those knowledgeable in the art, for which the platform is highly, expressively programmable. The output of system generated analyses and simulations such as estimated risk tolerances, underwriting guides, capital sourcing recommendations among many others known to those knowledgeable in the art may then be sent directly to dedicated displays or formatted by the connector module 135 and distributed to existing or existing legacy infrastructure solutions to optimize business unit interaction with new, advanced cross functional decision recommendations 404. The end result is that decision makers can focus on creative production and exception based event management rather than simplistic data collection, cleansing, and correlation tasks 405.

Figure 5:
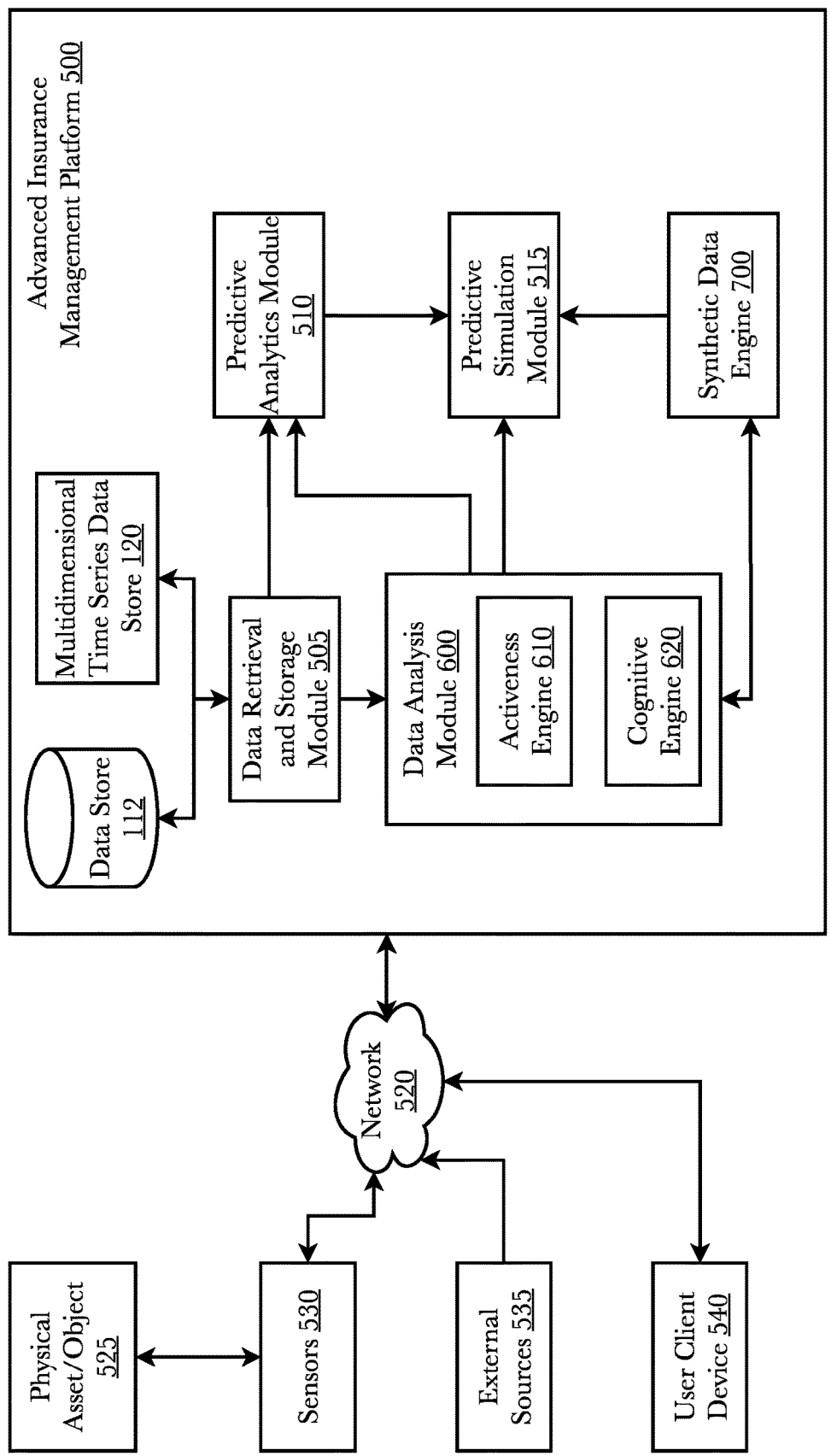
FIG. 5 is a block diagram of an exemplary system architecture of an advanced insurance management platform, according to an embodiment.

FIG. 5 is a block diagram of an exemplary system architecture of an advanced insurance management platform, according to an embodiment. According to an embodiment, business operating system 100 may further comprise one or more sensors 530 configured to collect data about one or more physical assets and/or objects 525, a network 520 to receive and transmit data, a data analysis module 600, a predictive analytics module 510, a predictive simulation module 515, and a synthetic data engine 700 which may be used to further configure business operating system 100 into a system for insurance management 500 and to produce more detailed and useful information for calculating risk scores, underwriting, policy setting and/or adjustment, predictive simulation and modelling, and a host of other insurance related functions. System 500 may utilize one or more remote sensors 530 to collect and obtain data related to entities including, but not limited to, individual people, groups of people, an organization, a process (e.g., mechanical, electrical, software or hardware implemented, social, etc.), devices, objects (e.g., buildings, automobiles, people, machinery, roadways, and other physical assets), risk events, and risk mitigation. In one embodiment, included in the plurality of sensors 530 may be a plurality activeness data devices. The activeness data devices (e.g., sensors) may collect and/or store data descriptive and/or indicative of a level of activeness of one or more objects. The activeness data devices may, for example, comprise one or more sensors (e.g., web-based cameras and/or motion sensors, or other activeness sensors), databases, and/or third party data and/or sensing devices configured and/or situated to determine activeness data.

Part of the system is a deployment of various sensors 530 which seek to measure the activeness of objects 525, and other sensors that can monitor the behavior of objects 525. The data gathered from the activeness sensors may be passed through a data analysis module 600 which can transform the data as necessary and then output various activeness metrics associated with the object. As more data is collected from many objects, the activeness data can be used to overlay onto a geographical map which can create a sort of population (activeness) density around the monitored objects. Information gathered from the other sensors 530, which can collect behavior data of objects, may be used in conjunction with the activeness map to identify locations where activeness is high and where object behavior sensor data is sufficient and/or insufficient and/or indicating that object behavior is acting outside of normal or baseline behavior. For example, an object such as the entrance of a hotel and the sidewalk that abuts it may be monitored by a plurality of sensors such that the activeness of the hotel entrance and sidewalk can be tracked and calculated and the behavior of object is monitored. A behavioral sensor may be affixed to a water spigot located just to the right of the hotel entrance and the behavioral sensor may indicate that the water spigot is leaking, causing the sidewalk in front of the hotel entrance to become wet and potentially slippery. The activeness sensors indicate that there is a lot of activity on the sidewalk and that there is a greater likelihood that a person may slip on the wet sidewalk caused by the leaking water spigot. This information may be used by an insurance provider when assessing risk and loss events for the hotel, or it can be used by the hotel operator to ensure that the leaking water spigot is fixed so as not to cause potential injury or loss.

According to an embodiment, system 500 may receive various information and types of data from a plurality of sources. Data may be received, retrieved, or otherwise obtained from sources which may include, but are not limited to, public and/or private databases, $3^{rd}$ party databases, social media, external sources 535, user client device 540 (e.g., smart phone, desktop, laptop, tablet, etc.), email, voice and/or video calls, text messaging services, Internet-of-Things (IoT) devices, sensors, activeness data devices, mobile devices (e.g., cell phone, tablet, laptop, smart wearable, etc.), actuators, desktop computer, webapp, questionnaires, surveys, personality test and/or quiz, games (e.g., mobile games, social media games, web-based games, etc.), vehicles (e.g., vehicle telemetric data), insurance providers, financial enterprises (e.g., banks, credit agencies, etc.), insurance contracts, the internet, internet service providers, cellular network providers, utility service providers and the like. Data from these and other sources may be accessed and received via a network 520.

The network 520 connections depicted in FIG. 5 include a local area network (LAN) and a wide area network (WAN), but may also include another type of network. When used in a LAN networking environment, system 500 (e.g., in some instances a server) may be connected to the LAN through a network interface (e.g., LAN interface) or adapter in a communications module. When used in a WAN networking environment, the network 520 may include a modem or other means for establishing communications over the WAN, such as the Internet or another type of computer network. It will be appreciated that the network connections shown are illustrative, and other means of establishing a communications link between the system 500, the sensors 530, external sources 535, and client devices 540 may be used. Various well-known protocols such as TCP/IP, Ethernet, FTP, HTTP and the like may be used, and the system may be operated in a client-server configuration to permit a user to retrieve a web page from a web-based server. Further, various conventional web browsers may be used to display and manipulate web pages.

All data received, retrieved, or otherwise obtained by system 500 via data retrieval and storage module 505 may be persisted to data store 112 and multidimensional time series data (MTSD) store 120. For example, streaming sensor data received by system 500 may be stored as time series data in MTSD 120 since preserving the time and order the streaming sensor data was received at can be important for downstream processes and analysis. Data store 112 may be configured to store a plurality of data including, but not limited to, physical asset and/or object data (e.g., location, policy information, risk levels, activeness levels, object state, etc.), customer profiles, contextual information, cognitive information, cognitive maps, sensor data, preferences, a plurality of insurance contract underwriting terms (e.g., general and/or specific to a physical asset), historical data (e.g., historic activeness information and historic cognitive information), third party and external data (e.g., GPS location data, social media data, cell phone data, email data, etc.), telemetry data, behavioral data, traits, personality information and the like. According to some embodiments, data retrieval and storage module 505 may leverage the high volume web crawler module 115 and the connector module 135 to facilitate data retrieval. In other embodiments, either of or both of the general transformer service module 160 and decomposable transformer service module 150 may also be incorporated into data retrieval and storage module 505 to facilitate transforming the received data into proper format for storage and processing by system 500 components.

According to some embodiments, data retrieval and storage module 505 may retrieve a plurality of data from a plurality of sources accessible via the network bb as well as retrieve data from data store 112 and MTSD 120 and then format and forward this data to various system 500 components. For example, data retrieval and storage module 505 may retrieve and send various sensor data and cognitive information to data analysis module 600 for processing. Similarly, data retrieval and storage module 505 may identify a plurality of risks associated with a physical asset and the magnitude of the risks and then send this information to a predictive analytics module 510 which can use received data to generate various models, such as a vulnerability model.

According to some embodiments, data analysis module 600 may receive a plurality of information in order to generate a cognitive density metric associated with a physical asset and/or object. Data analysis module 600 may comprise an activeness engine 610 and a cognitive engine 620. Activeness engine 610 may receive a plurality of data, such as sensor and third party data, and process the received data to determine or otherwise produce an activeness metric associated with a physical asset and/or object. The activeness metric represents the activeness of or density of actors (e.g., people) who interact with or are associated with the physical asset. Cognitive engine 620 may receive a plurality of information, such as contextual information and cognitive information, and process the received information to generate or otherwise produce a cognitive map for an individual or group of individuals. The cognitive map of an individual or group of individuals takes into account the decision making processes and there outcomes of an individual (or group of individuals) in order to determine their propensity for risk (e.g., risk-averse or risk-seeking). Individually, both the activeness metric and the cognitive map of an individual may be used to assess risk or to determine a risk score. Data analysis module 600 can be configured to combine the activeness metric associated with a physical asset and the cognitive ability of individuals or group of individuals who interact with the physical asset to form a more comprehensive risk assessment metric, the cognitive density metric. The cognitive density metric may be stored in data store 112 for future use, such as by predictive analytics module 510.

According to some embodiments, predictive analytics module 510 may receive a plurality of data from various data sources in order to generate one or more models that relate insurance contract terms to a plurality of risk events. For example, predictive analytics module 510 may receive insurance contract underwriting terms, the magnitude of a plurality of risks, and the cognitive density metric in order to generate a vulnerability model which can leveraged to determine one or more risk responses of the physical assets. Furthermore, the vulnerability model could be used to predict a loss associated with the physical asset. In some embodiments, predictive analytics module 510 may make use of or leverage automated planning service module 130 in order to facilitate model creation.

The risk response(s) determined by predictive analytics module 510 may be received, retrieved, or otherwise obtained by predictive simulation module 515 which can use the received risk response as an input to generate a blended exposures and losses model. Additionally, predictive simulation module 515 may generate or receive synthetic data from synthetic data engine 700 and then pass the synthetic data through the blended exposures and losses model to determine risk/loss associated with a physical asset.

The cognitive map of an individual can be used in combination with the activeness data of an object and/or individual to form a cognitive density metric, which can be used to identify locations/situations where an individual may be more at risk of injury/loss due to the activeness associated with the object/individual and the cognitive ability of the individual or group of individuals interacting with a location/situation. Graph and predictive analytics may be used to determine which risk events are most likely to occur affect an object (e.g., person, physical asset) or a location. For example, historical risk event data may be graphically analyzed by predictive analytics module 510 and/or graph stack service 145 in order to predict a most likely to occur risk event for a given location and/or time. The identified risk events may then be included with cognitive density metric(s) as an input into a predictive analytics module 510 which can be leveraged to determine risk event decisions and outcomes. The various inputs and risk event decisions and outcomes may be used to create a hazard model which takes into account the associated risk of the activeness metric, the associated risk of the cognitive abilities of affected individuals during various risk events, and the physical and/or financial loss risk associated with the risk event to determine a comprehensive and detailed risk score for the object.

In some embodiments, system 500 and its processes and actions may also or alternatively comprise one or more actions associated with insurance underwriting. Insurance underwriting may generally comprise any type, variety, and/or configuration of underwriting process and/or functionality that is or becomes known to practicable. Insurance underwriting may comprise, for example, simply consulting a pre-existing rule, criteria, and/or threshold to determine if an insurance product may be offered, underwritten and/or issued to customers, based on any relevant activeness data According to some embodiments, the cognitive density metric may be used as one input into at least one of or both of a predictive simulation module 515 in order to perform advanced simulations for assessing risk and predictive analytics module 510 for predictive analytics regarding risk assessment. The output from these modules represent a comprehensive, detailed risk prediction using activeness data as well as other data.

According to some embodiments, system 500 may also comprise a cognitive engine 620 which receives, retrieves, and/or otherwise obtains a plurality of data in order to produce and manage one or more cognitive maps for an individual person, entity, or object. Once produced, cognitive map may be used by system 500 as an input into graph analysis, predictive analysis, and advanced simulation modules 510, 515 in order to produce comprehensive and detailed risk prediction for a given individual person, entity, or object. Cognitive maps may comprise a plurality of information such as, for example, contextual information, cognitive information, and risk or loss exposure information, which may be analyzed by cognitive engine 620 to determine and/or identify decision making processes via heuristics and analytics. Decision making processes may be used to analyze an individual, group of individuals, or an entity's risk related decisions and to determine whether the decision outcome was positive of negative. The result of this analysis by cognitive engine 620 is an individual's or group of individuals' or an entity's propensity for risk, which may be used as an input into predictive analytics module 510 and/or predictive simulation module 515 in order to produce a detailed risk prediction.

Figure 6:
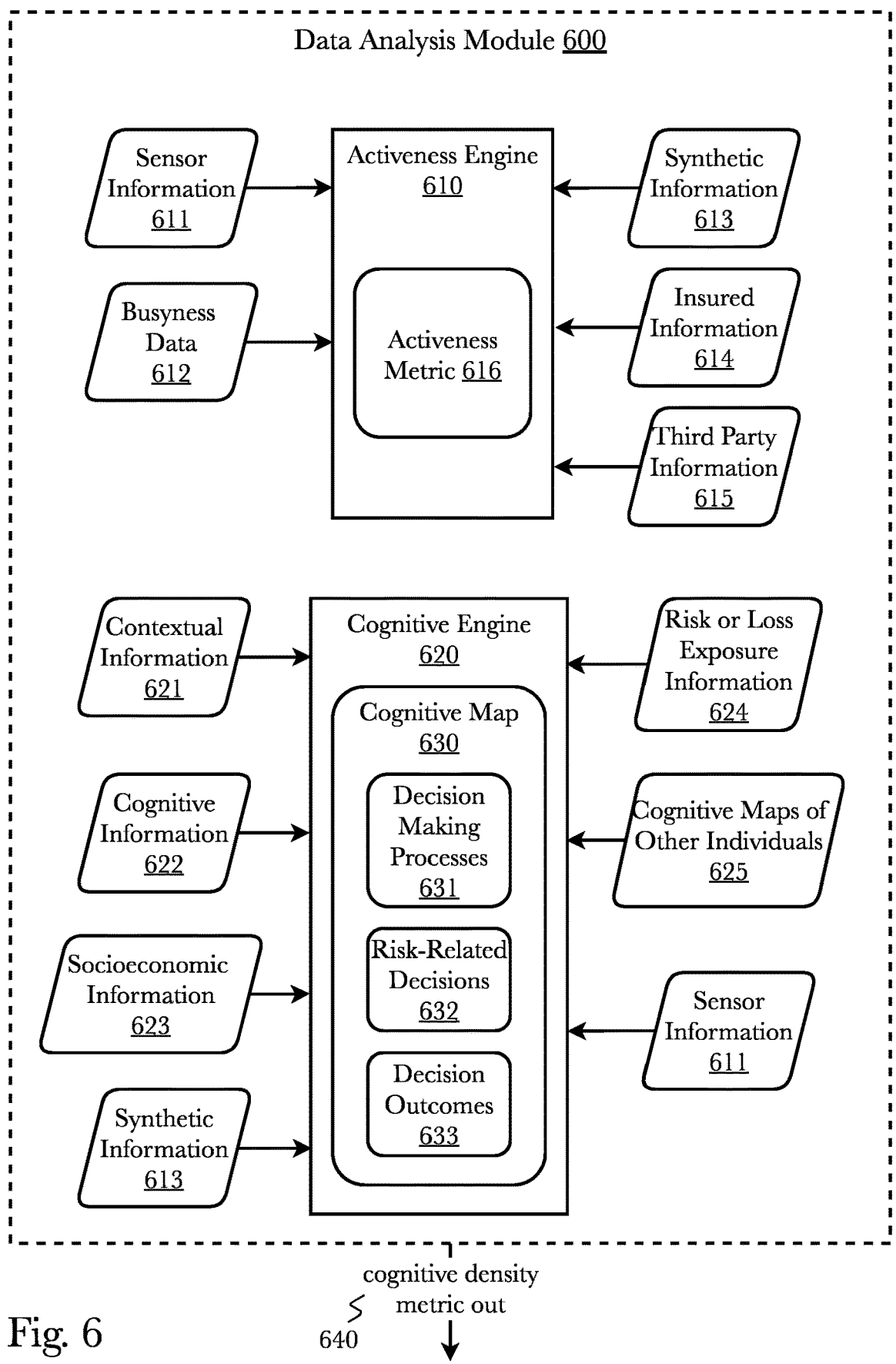
FIG. 6 is a block diagram illustrating an exemplary architecture for an aspect of the advanced insurance management platform, the data analysis module.

FIG. 6 is a block diagram illustrating an exemplary architecture for an aspect of the advanced insurance management platform 500, the data analysis module 600. According to some embodiments, data analysis module 600 may comprise an activeness engine 610, a cognitive engine 620, and a plurality of information from a plurality of sources. In some embodiments, the activeness data 612 gathered and/or stored by one or more activeness data devices can be queried, collected, sensed, looked-up, and/or otherwise obtained and/or determined by an activeness engine 610. The activeness engine 610 may, for example, comprise one or more computers and/or servers in communication with activeness data devices. Activeness engine 610 may also receive, retrieve, or otherwise obtain various other sensor information 611, synthetic information 613, third party information 615, and insured information 614 in order to calculate an activeness metric 616.

According to some embodiments, activeness engine 610 may perform a variety of processes and actions associated with activeness data 613. The activeness data 612 of one or more objects (and/or physical assets) that may be related to and/or otherwise associated with an insurance product and/or policy, for example, may be determined, calculated, looked-up, and/or derived. In some embodiments, the activeness data 612 may be gathered as raw data directly from one or more activeness sensors discussed herein and/or configured to record data indicative of a level of activeness of the object. One or more cameras in proximity to a particular sidewalk, for example, may transmit and/or otherwise provide activeness data 612, indicative of the level of activeness (e.g., images, videos, and/or other representations of pedestrian traffic along a sidewalk). In some embodiments, activeness data 612, may be provided by an insured/policy holder 614 and/or by third party 615 (e.g., cell phone tracking via GPS and/or social media "check-in" functionality; as received from the insured and/or third party such as a GPS provider and/or social media server).

Activeness data 612 may be gathered from a plurality of sources. The plurality of activeness data may comprise information indicative of a level of activeness of a single object or may comprise information indicative of a level of activeness of a plurality of object and/or types of objects. For example, a first activeness data 612 may be descriptive of a current sales volume at a particular supermarket, while other activeness data 612 may be descriptive of historical sales volume for all analyzed supermarkets in a particular geographic region. In some embodiments, the first activeness data 612 may be descriptive of a number of times per hour (e.g., rate) at which a drawbridge opens and closes while other activeness data 612 may be descriptive of a level of road traffic traveling across the drawbridge.

According to some embodiments, activeness engine 610 may perform processes and actions associated with activeness data processing. For example, some or all of activeness data 612, sensor information 611, synthetic information 613, insured/policy holder information 614, and third party information 615 may be determined, gathered, and/or otherwise obtained for activeness processing. In some embodiments, actions carried out by activeness engine 610 may comprise aggregation, analysis, calculation, filtering, conversion, encoding and/or decoding (including encrypting and/or decrypting), sorting, ranking, and/or any combination thereof. According to some embodiments, activeness engine 610 may execute specialized program instructions to process the activeness data 612 to define an activeness metric 616 and/or index. Such an activeness metric 616 may, for example, be descriptive (in qualitative and/or quantitative manner) of historic, current, and/or predicted activeness levels of an object. In some embodiments, the activeness metric may be time dependent (e.g., a level of activeness of a computer network may be determined based on any given time of day), time or frequency based (e.g., foot traffic per hour), and/or an average, mean, and/or other statistically normalized value (e.g., an index).

According to some embodiments, the level of activeness may be determined by calculating the people density in a given area divided, e.g., the number of people in a given area divided by the area (or volume) occupied. In particular, if there are four people in a twelve square foot (12 sq. ft.) area (e.g., three feet by four feet), this may be considered very crowded or busy, and there is a high likelihood that one person's actions will affect at least one other person. However, if only four people occupy a space of twelve thousand square feet (12,000 sq. ft.), this would likely be considered not crowded or busy. In some embodiments, there may be pre-set dimensions for commonly used areas, such as lanes on highways or aisles in grocery stores, which may have predetermined standard width for calculating density. However, for other locations or objects, the dimensions may need to be determined or provided by other sources, such as activeness data devices or from the insured directly, e.g., provided by the potential insured in an on-line application for insurance. Also, the size of the area may need to be "cropped" to be only the area where the people are located not the entire potential use are. For example, if there are four people in a 12,000 sq. ft. area, but they are all located within three feet of each other, e.g., because there is something of interest in that area, then the area for which the density is calculated may be cropped (or reduced) to more accurately calculate the people density. In some embodiments, there may be a people dispersion determination level or mapping which shows the people density variation across an object and/or physical asset. For example, observation and state estimation service 140 and graph stack service 145 may utilized to create a two or three dimensional electronically displayed map, chart, or graph which shows a view (e.g., top view, or any other view) of a activeness object and show the people density levels across the object in different colors (e.g., orange is high density, green is low density) or topographical lines (e.g., close lines show high density, further spaced lines show low density) or any other format.

Also, there may be a means to show past, present and/or predicted future density (or activeness) levels across an object.

According to some embodiments, the number of people and/or objects in a given area (e.g., utilized for calculating activeness density) may be determined utilizing GPS and/or other satellites, triangulation, RFID, and/or location and/or tracking technologies (e.g., such as may be employed to locate and/or track a person's cellular telephone and/or other computer device). System 500 may connect with such devices via network 520 connection suitable for the connecting device, for example, using an internet connection and connecting through the cloud 107.

Activeness data 612 for a class of objects such as communication conduit objects and/or for a particular type of object (such as Wi-Fi router) within a class of objects (such as electronic devices) may, for example, be analyzed to determine relationships between various activeness data and/or metrics and empirical data descriptive of actual insurance losses for such object types and/or classes of objects. Activeness engine 610, according to an embodiment, may conduct regression and/or other mathematical analysis of various activeness metrics to determine and/or identify mathematical relationships that may exist between such metrics and actual sustained losses and/or casualties. System 500 may determine a pure premium using simulation testing and analysis that predicts expected total losses (activeness-based and non-activeness-based) over time.

According to some embodiments, the time rate of change of an activeness metric (i.e., its derivative) may be of use and calculated by activeness engine 610 in order to indicate the velocity at which the measured and/or calculated activeness of an object is changing. Likewise, in some embodiments, the derivative of the velocity (i.e., second derivative) of the activeness metric 616 may be useful and measured and/or calculated by activeness engine 610 in order to determine the acceleration or rate at which the velocity of the activeness metric 616 is changing as it relates to an object. For example, if the value of activeness acceleration is non-zero it may be an indication that the risk of injury or loss is extremely high, e.g., in the case where a large group of people or mob forms or disperses very quickly, due to panic or otherwise. Indications of the formation of large groups, such as "flash mobs," for example, may be indicated by increased cell phone activity and/or increased web traffic at social media sites, for example. In such cases, a riot may occur, looting may occur, or people may get trampled or otherwise injured and/or property may get damaged.

Furthermore, activeness engine 610 may comprise more sophisticated, single variable or multivariate, single order or multi-order activeness models and/or equations that analyze the activeness data and correlate it to risks and/or losses, and/or for any other uses. In some embodiments, there may be other inputs, variables or events that may trigger higher levels of activeness, such as severe weather events, natural disasters, evacuations warnings/alerts, catastrophic events, earthquakes, tornadoes, hurricanes, blizzards, mudslides, typhoons, sporting events, concerts, wars, terrorists/enemy attacks, or the like. Such correlations may be used, for example, to predict the level of activeness in certain areas and thereby help assess and plan for risk and/or severity in injury and/or losses associated with one or more events occurring. They may also be utilized for planning crowd control resources, natural or man-made resources, utilities, or infrastructure management (e.g., water, electricity, fuel, etc.), or designing escape or evacuations routes, or for any other purpose.

According to some embodiments, a cognitive engine 620 may also be present in data analysis module 600 and which may be configured to receive, retrieve, or otherwise obtain a plurality of information from a plurality of sources in order to generate a cognitive map 630 for an individual or group of individuals. A cognitive map 630 may be used, in some embodiments, for determining a plurality of things such as, a claim adjustment, a policy offer and/or adjustment, a risk assessment, a risk score, an underwriting, a cost of insurance and the like. Cognitive engine 620 may utilize monitored or inferred risk-related decision information in order to generate a cognitive map 630. Monitored or inferred risk-related information may include, but is not limited to, contextual information 621, cognitive information 622, socioeconomic information 623, synthetic information 613, risk or loss exposure information 624, various sensor information 611, and/or cognitive maps of other individuals 625 that is used for one or more risk-related decisions 632 in one or more risk-related situations.

Additionally, information such as: risk information, individual information, behavioral information, geographic information, traits, physical characteristic information, personalities, preferences, level of risk behavior, social connections with other individuals, credit score, and/or other demographic information may be received, retrieved, or otherwise obtained and stored by system 500 which may then be processed via a system 500 component, such as, for example, cognitive engine 620, in order to generate or otherwise produce an output. According to some embodiments, this additional information may also be used by cognitive engine 620 to classify one or more individuals into groups based on the additional information as well as the information referenced in FIG. 5. According to some embodiments, the cognitive information for a group of individuals may be stored as a single cognitive map or collection of cognitive maps.

According to some embodiments, cognitive engine 620 may use individual profile data to create a cognitive map of the individual. Individual profile data may include, but is not limited to, name, age, gender, address, policy information, risk assessment, activeness metric(s), assets owned and/or insured/underwritten, questionnaire and/or survey responses, owned mobile devices (e.g., cell phone, smart wearable), social media data, sensor data (e.g., data gathered from a personal mobile device, from a smart wearable device, activeness data device, etc.), health record data, cognitive data and the like. Individual profile data may be gathered from a plurality of sources including, but not limited to, social media accounts (e.g., posts, comments, likes/dislikes, subscriptions, etc.), user-provided data (e.g., such as during initial user account set up or subsequent account interactions, user-submitted responses to questionnaires/surveys, etc.), third-party sources, and the like. In some embodiments, individual profile data may be derived and/or inferred via data and/or behavioral analysis. For example, if an individual is a member of several rock climbing groups on social media, and also often posts pictures on social media of them skydiving, then the system, such as via the mapping engine, may infer that the individual is a risk-seeker and this inferred information may be included in the cognitive map of the individual.

Contextual information 621 may refer to data regarding the surroundings, environment, circumstances, background, reasoning, or settings that determine, specify, interpret, or clarify the meaning of an event or other occurrence. For example, in the context of automobile insurance, contextual information may be used to determine that a vehicle operator is late for work. In this example, context information could include historical data of normally leaving the home 15 minutes prior, a text message including the phrase "I'm late for work," or an irregularity in a normal routine (such as turning on the vehicle 15 minutes later than normal). In this example, the fact that the vehicle operator is running late (such as direct admission in a text message or inferred from the deviation from a normal time leaving their home) is contextual information relating to the decision of whether or not to speed to work or run a yellow light (risk-seeking behavior) or calling work to move a meeting (risk-averse). contextual information from a plurality of sources may be used to confirm or increase the accuracy of the decision related information. In some embodiments, a pattern of behavior is identified through contextual information, wherein the deviation from the pattern is identified and used to confirm or increase the accuracy of the decision information.

According to some embodiments, cognitive information 622 may be received, retrieved, or otherwise obtained from a plurality of sources including, but not limited to, quizzes and/or questionnaires, personality tests, games, customer feedback (e.g., comments, reviews, etc.), electronic health records (EHRs), insurance providers, financial institutions (e.g., banks, consumer reporting agencies, etc.), private and/or public databases, application programming interfaces (APIs), mobile device software application (e.g., smart phone "app"), tablets and/or laptops, smart wearables (e.g., smart watch, biometric sensors, pacemaker, hearing-aid, etc.), personal computers (e.g., desktop PCs), cell phone companies, utilities providers (e.g., gas, electric, water, etc.), sensors, activeness data devices, social media (e.g., social network server), smart meters, vehicle and/or building telemetry transmissions, the internet (e.g., via a web page or application), text messaging services, email, voice and video data, customer profile set-up and settings (e.g., customer profile/account creation at beginning of underwriting process), and various other third party and external sources.

The cognitive information 622 may be mapped for different situations (e.g., risk and/or loss events) and may include statistical information related to the probability of use of one or more cognitive processes in specific (or generalized) situations. For example, the cognitive map may include information indicating that the individual uses the heuristic decision-making process of overconfidence 80% of the time when they are operating a vehicle and running late for an event. The cognitive map may further include statistical information that correlates one or more decision-making processes 631 and decision outcomes 633 for one or more situations. This correlated information may further include an assessment of the level of risk associated with the one or more decision-making processes 631 or a generalized risk assessment (from risk-seeking to risk-averse, for example) of the individual based on the correlations. The cognitive map 630 may include statistical information indicating the number, probability, propensity, or percentage of the risk-related decisions made by the individual that fall into risk-seeking or risk-averse categories.

According to some embodiments, cognitive information 622 in a cognitive map for an individual may be adjusted or changed by providing feedback information, providing direction or guidance, providing encouragement, or directly modifying the behavior of an individual such that for one or more situations their behavior changes, choice of using one or more risk-related decision process changes, or more decisions result in a positive decision outcomes or fewer negative decision outcomes.

In some embodiments, decision information or information used to determine decision information is obtained from an external (e.g., third party) data provider, an external data source, or an external network. External sources include data sources external to the individual such as social networks, cellular service provider networks, internet connection suppliers, email hosting service providers, website hosting service providers, government networks (such as police or homeland security networks), security camera networks, weather data networks or providers, credit card companies, geographic data providers or networks, healthcare provider network, Internet audience data aggregator or provider, internet-based services provider (such as Google Inc., Microsoft Inc., Yahoo Inc., Apple Inc., etc.), an online or brick-and-mortar merchant (such as Apple, a chain of liquor stores, a grocery store, Amazon.com, etc.), and other networks or data sources comprising information related to the individual, decision information, or information used to determine decision information.

In some embodiments, the cognitive map 630 includes historical cognitive information such as cognitive capacity, cognitive skills, cognitive speed, cognitive load, or cognitive processes. The historical cognitive information may be used, for example, to determine which heuristic decision-making processes the individual uses in risk-related situations in general or in specific situations. In other embodiments, the historical cognitive information is analyzed to determine correlations, patterns, or relationships between risk-related decision-making processes and the resulting decision outcomes.

Socioeconomic information 623 and other demographic information may be processed and analyzed by cognitive engine 620 and used as an input when creating a cognitive map of an individual or group of individuals. Socioeconomic information and other demographic data may be used as part of the determination of cognitive information 622 and/or ability as well as contextual information 621. For example, the cognitive ability of an express bus full of people transiting from a suburb to large city downtown center may be determined in part based on obtained and/or inferred socioeconomic information 623 and other data (e.g., demographic) sources. Continuing the example, system 500 can obtain, via network 520, bus route information to determine the starting location of the express bus in order to determine the zip code where the bus occupants are likely to live, then the system 500 can use that zip code to extract a plurality of demographic data related to that zip code. For example, using the zip code system 500 could determine average median income, average median cost of living, voting percentages, average credit rating, education levels, job distribution, census information, and cell phone data, and data analysis module 600 can use this information to create a socioeconomic profile for the people living in the zip code and, more importantly, the people who regularly use the express bus. In this way, socioeconomic information 623 may be used by cognitive engine 620 to create a cognitive map 630 of an individual or group of individuals.

Synthetic information 613 may comprise data created by or with the support of synthetic data engine 700. Synthetic information 613 may be used to supplement existing datasets where some information is missing or to create new synthetic datasets, in either case the supplemented dataset or new synthetic dataset can be used as an input to cognitive engine 620 in order to create a cognitive map 630.

Risk or loss exposure information 624 may be used as an input to cognitive engine 620 in order to create a cognitive map of an individual or group of individuals. Risk (exposure) information may be related to a decision or judgment made by an individual to one or more risks that could affect the decision-making process of the judgement process. Loss (exposure) information may be related to a risk-related decision or judgement made by an individual which comprises information related to a physical asset and/or object (such as a vehicle), information related to the peril or covered risk (as opposed to non-covered risk), and information related to the consequences of the loss (e.g., such as getting a cracked windshield on a vehicle that leads to a reduced valuation).

According to some embodiments, cognitive maps 630 of other individuals may be analyzed by cognitive engine 620 to identify similar characteristic information between existing cognitive maps and new maps of individuals such that similar maps may be grouped together.

The cognitive map 630 may be used to determine a risk score based on whether the individual or group of individuals is risk-seeking or risk-averse. The risk score may be determined by analyzing the data used as input into cognitive engine 620 in order to determine an individual's or group of individuals' decision making processes 631 based on assessed risk-related decisions 632 and the decision outcomes 633 the individual has experienced over time.

According to some embodiments, decision making processes 631 may be characterized by a set of heuristics consistent with the bounded rationality model of decision making where the ability of individuals to be rational in a decisions is limited by the cognitive capacity, the amount of contextual information 621 related to the decision, and time available to make the decision. For example, reflexive decision-making processes, which refer to the process of making decisions or choices purely based on gut instinct. In reflexive decision-making processes the decision-maker makes a choice based on intuition or how it feels to him or her. Other examples of heuristics include, but are not limited to: anchoring, representativeness, base rate fallacy, conjunction fallacy, dilution effect, misperception of randomness, ignorance of sample size, affect, control, effort, scarcity, attribute substitution, consensus, confirmation bias, and overconfidence. Other heuristics or cognitive impairments, such as those related to PTSD and those known and unknown in the science of cognitive psychology, may be used for generating a risk score, a cost of insurance, or a risk score and cost of insurance. In one embodiment, cognitive engine 620 may use one or more decision-making process under a plurality of situations may be analyzed for an individual or group of individuals.

According to some embodiments, the risk-related decision 632 information obtained from data sources may be used to determine one or more of the following: when one or more risk-related decisions were made; which decision-making heuristic processes were used in the one or more risk-related decisions; the classification of the individual into one or more groups (based on common or similar risk-related decision information, contextual information, traits, physical or mental condition, personalities, level of the risk behavior from risk-seeking to risk-averse, social connections with other individuals, or other demographic information); contextual information for the decision; risk and loss exposure information; the characterization of the use of a specific decision-making process in a specific situation (either generally, by a specific individual, or a group of individuals) as risk-seeking, risk-averse or a level of risk between risk-seeking and risk-averse; the identification of a decision outcome; if the outcome is positive, neutral, or negative; and the correlation between one or more decision-making processes with one or more decision outcomes 633.

Data analysis module 600 can be configured to combine the activeness metric associated with a physical asset and/or object with the cognitive map(s) of an individual or group of individuals associated with or most likely to associate with the physical asset and/or object, in order to generate a cognitive density 640 metric associated with the physical asset and/or object. The cognitive density metric 640 may represent, on average or at any given time or period of time, the cognitive capabilities of the various actors interacting with a physical asset, and how that may affect the risk and loss exposure of the physical asset as the number (e.g., density or activeness) of people change over time. For example, the activeness metric 616 associated with a physical asset, such as a hotel and the sidewalk that abuts the hotel entrance, varies throughout the time of day but is highest during the morning and late afternoon as a bus stop is located on the sidewalk that abuts the hotel entrance and is a major connecting bus for commuters. This activeness metric 616 may be combined with the cognitive map 630 associated with the group of individuals who ride an express bus that drops commuters off in the morning at the bus stop in front of the hotel; the cognitive map 630 for this group of commuters indicates that, due to a variety of factors, such as the desire to make it onto the connecting bus in order to get to work on time, the group of commuters are risk-seeking (e.g., they have a higher propensity for risk). Once combined, a business establishment, insured and/or policy holder, and/or insurance provider can use the cognitive density metric 640 to more accurately assess risk and loss in near real-time associated with a physical asset and/or object of interest. Additionally, cognitive density metric 640 may be used as an input into either of or both of a predictive analytics module 510 and a predictive simulation module 515 for generation of one or more risk or loss related models. In some embodiments, the cognitive density metric 640 may be used by graphstack service 145 in order to produce a map of a geographic area of interest, such as surrounding a physical asset, that indicates the cognitive density of the area.

Figure 7:
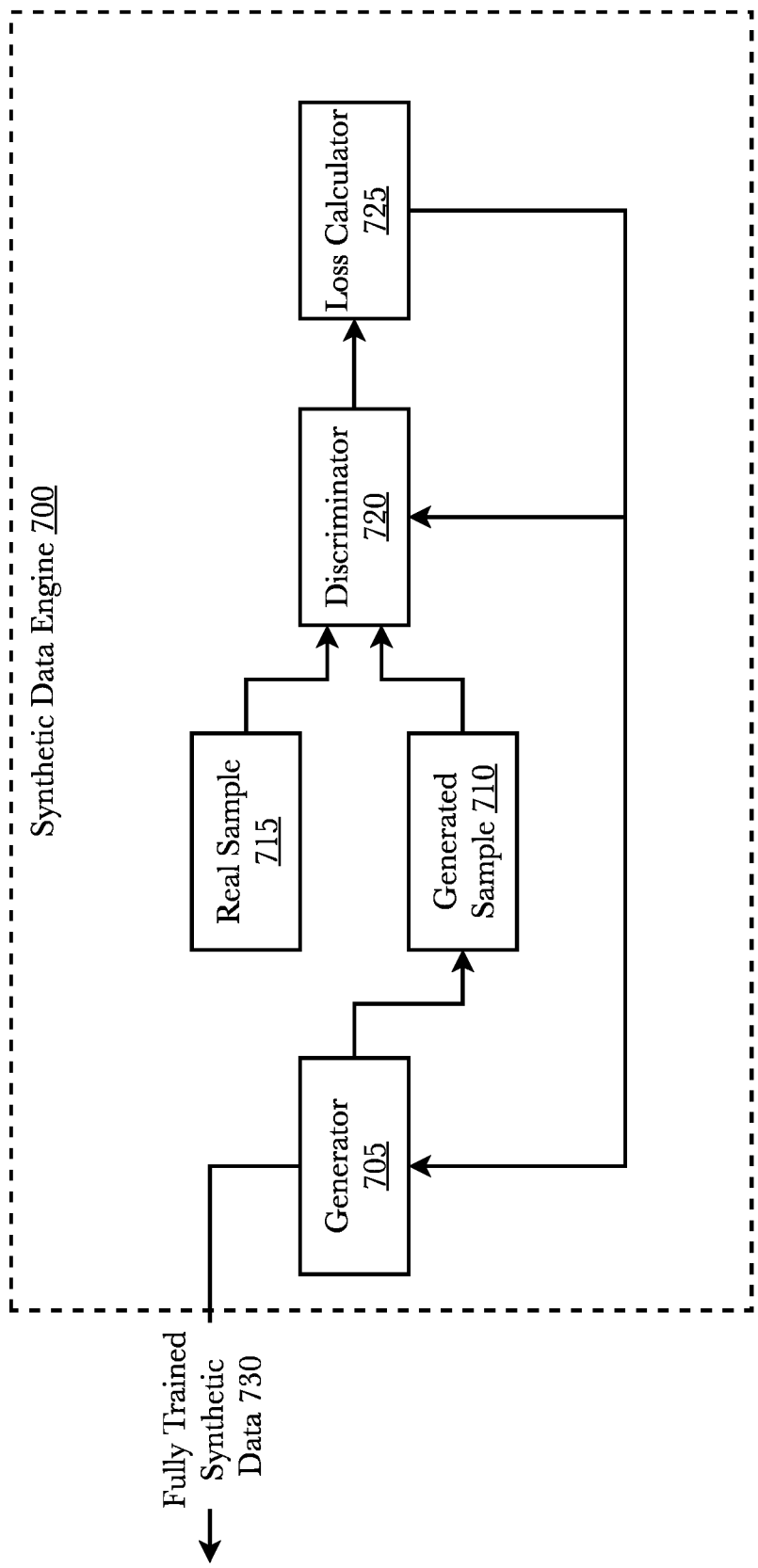
FIG. 7 is a block diagram illustrating an exemplary architecture for an aspect of the advanced insurance management platform, the synthetic data engine.

FIG. 7 is a block diagram illustrating an exemplary architecture for an aspect of the advanced insurance management platform 500, the synthetic data engine 700. According to some embodiments, synthetic data engine 700 may comprise a generative adversarial network (GAN) which may be configured to produce synthetic data related to risk events, activeness data, and cognitive functions of individuals and/or groups of individuals. GANs are deep learning architecture generative models that simultaneously train two models: a generator model and a discriminator model. Synthetic data engine 700 and/or the GAN may comprise a generator 705 model and a discriminator 720 model. Generator 705 model may take an input code (e.g., data set) and generate new samples based on the input code. Discriminator 720 models takes real 715 and generated 710 samples and tries to distinguish (i.e., to classify) real samples 715 from generated samples 710. At the output of discriminator 720 is a declaration of which received data were real and/or fake. A loss calculator 725 analyzes the output of the discriminator 720 against the input samples to determine a loss function that may represent the difference between the output and the input data. The loss data may be used in a feedback loop with generator 705 model and discriminator 720 model in order for both models to learn and adapt with each use of the GAN. Generator 705 and discriminator 720 may be trained simultaneously so that while generator learns to generate better samples, discriminator becomes better at distinguishing samples resulting in an improved sample generation performance at the end of training.

For example, if the GAN is trained with training data for discriminator 720 and sampled noise for generator 705, discriminator 720 is used to maximize the correctly labeled real samples 715 as real and generated samples as fake. On the other hand, generator 705 tries to trick discriminator 720 to label the generated data 710 as real. These two models duel each other in a min-max game which ultimately results in a GAN capable of producing high-quality and useful synthetic data 730 which may be used by system 500 as input to various modules and models.

Of particular use to the disclosed system, synthetic data engine 700 and the GAN may be configured to produce synthetic cognitive maps of individuals or group of individuals. In order to accomplish this task, synthetic data engine 700 may receive, retrieve, or otherwise obtain cognitive maps/profiles that have been processed and constructed via data analysis module 600 which are associated with an individual and/or group of individuals. These cognitive maps may be obtained directly from data analysis engine 600 or from data store 112. These "real" (e.g., associated with actual individuals and/or group of individuals) cognitive maps/profiles may be used as real sample 715 input into discriminator 720 while generator 705 produces generated samples (e.g., fake cognitive maps/profiles) which also become inputs into discriminator 720. After careful training, this GAN can produce a synthetic cognitive map/profile of an individual or group of individuals which can be used by other system 500 modules to provide data for determination of various insurance related actions (e.g., underwriting, premium calculation and adjustment, risk/loss assessment, modeling, and/or mitigation, reinsurance calculation, policy issuance, claims adjustment, etc.).

Furthermore, synthetic data engine 700 and the GAN may be configured to generate synthetic data about or related to a physical asset. According to some embodiments, historical risk and loss data associated with a physical asset and/or a plurality of assets of the same type as the physical asset, may be received, retrieved, or otherwise obtained by synthetic data engine 700 and used as real sample 715 input into a GAN. Historical risk and loss data may include, but is not limited to, type of risk event, type of loss, magnitude of risk, magnitude of loss, date, time and location of risk event, physical asset(s) and/or object affected by risk event, and existing insurance underwriting terms associated with physical asset(s) and/or object during risk event. Utilizing historical risk and loss data, the GAN can be trained to produce high-quality and useful synthetic data related to risk and loss events that may occur during the lifespan of the physical asset and/or object based on, for example, the magnitude of each of the plurality of risks and the predicted loss associated with the physical asset.

According to some embodiments, synthetic data engine 700 may comprise one or more GANs each configured to generate synthetic data related to a plurality of real-world data and/or physical assets.

While all descriptions above present use of the advanced insurance decision and management platform for new clients, the majority of the above process is also applicable to such tasks as policy renewals or expansions.

DETAILED DESCRIPTION OF EXEMPLARY ASPECTS

Figure 8:
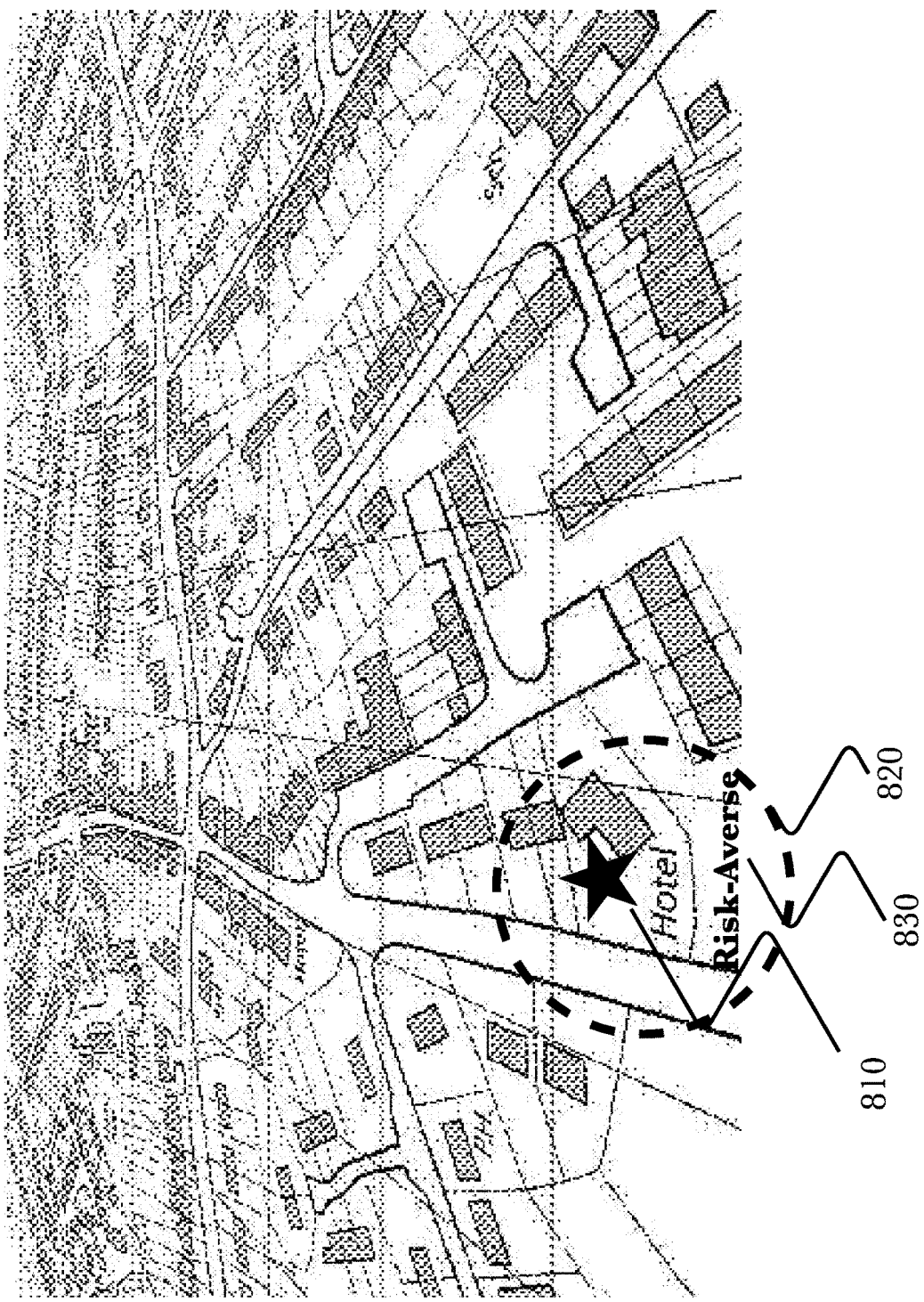
FIG. 8 is a diagram illustrating the cognitive density associated with a physical asset projected onto a geographic map of the location of the physical asset, according to an embodiment.

FIG. 8 is a diagram illustrating the cognitive density associated with a physical asset projected onto a geographic map of the location of the physical asset, according to an embodiment. The cognitive density metric may be overlaid onto a geographic map of the location of a physical asset and/or object in order to display the real or near real-time activeness levels and the cognitive capabilities of the individuals located around the physical asset. In this simplified exemplary diagram, the physical asset of interest is a hotel 810 marked with a star. Data related to the hotel 810 may be gathered from a plurality of sources such as external sources and remote sensors deployed at or near the physical asset 810. Sensor data may be used to determine an activeness metric associated with the hotel 810. According to some embodiments, the cognitive density metric may be displayed as an encircled area 820 which indicates the activeness levels and the risk propensity 830 and/or cognitive capabilities of the actors located in the encircled area. In this example, the area 820 has a high activeness level, but the individuals within the area are relatively risk-averse 830. In other embodiments, the cognitive density may be displayed as a heat map where different colors represent different cognitive densities. In other embodiments, the cognitive density may be represented as topographical lines wherein the distance between the lines represents the relative cognitive density of the area.

Figure 9:
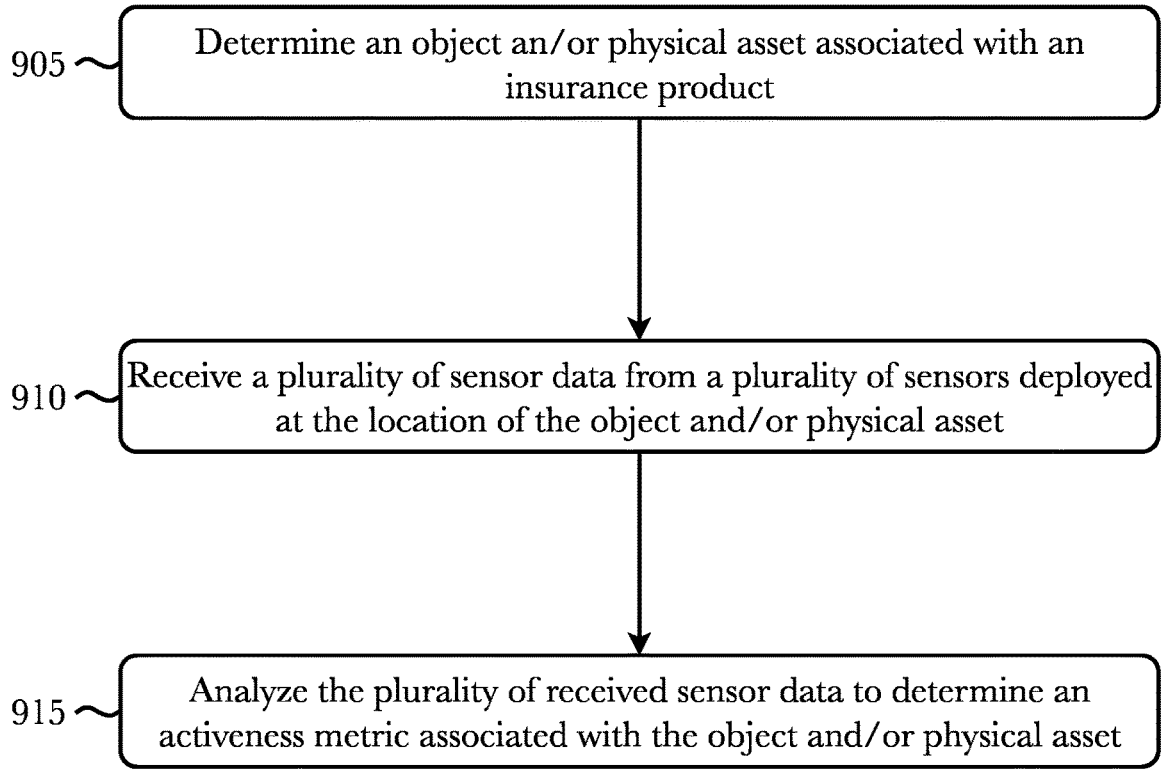
FIG. 9 is a method flow diagram illustrating an exemplary method for determining an activeness metric, according to some embodiments.

FIG. 9 is a method flow diagram illustrating an exemplary method 900 for determining an activeness metric, according to some embodiments. According to an embodiment, the process 900 begins with a determination of an object and/or physical asset associated with an insurance product 905. For example, data analysis module 600 may receive, retrieve, or otherwise obtain insurance contract underwriting terms in order to determine an object associated with the insurance contract underwriting terms and then pass the identified object to activeness engine 610 for further processing. In some embodiments, the object and/or physical asset may be determined based on historic location and/or predicted location data of the customer. As a next step, the system 500 and/or the data analysis module 600 can receive a plurality of sensor data from a plurality of sensors deployed at the location of the object and/or physical asset 910. In the case that there are no sensors deployed at the location of the object, then an intermediate action between steps 905 and 910 may include deploying and/or arranging a plurality of sensors at the location of the identified object. The plurality of sensors may provide streaming sensor data related to activeness and behavior of the monitored (e.g., via the plurality of sensors) object. Received sensor data may be formatted as necessary by data retrieval and storage module 505 and then persisted to data store 112 and/or MTSD 120. After sensor data formatting (if necessary) and storage, data analysis module 600 may receive, retrieve, or otherwise obtain the sensor data in order to analyze the plurality of data to determine (e.g., compute, calculate, etc.) an activeness metric associated with the object and/or physical asset 915. After the determination of the activeness metric of an object and/or physical asset, the activeness metric may be used for various processes by system 500. For example, the activeness metric may be used as a component for generating a risk rating of the insurance product and/or object, or the activeness metric may be combined with one or more cognitive maps to generate a cognitive density metric associated with the object and/or physical asset.

Figure 10:
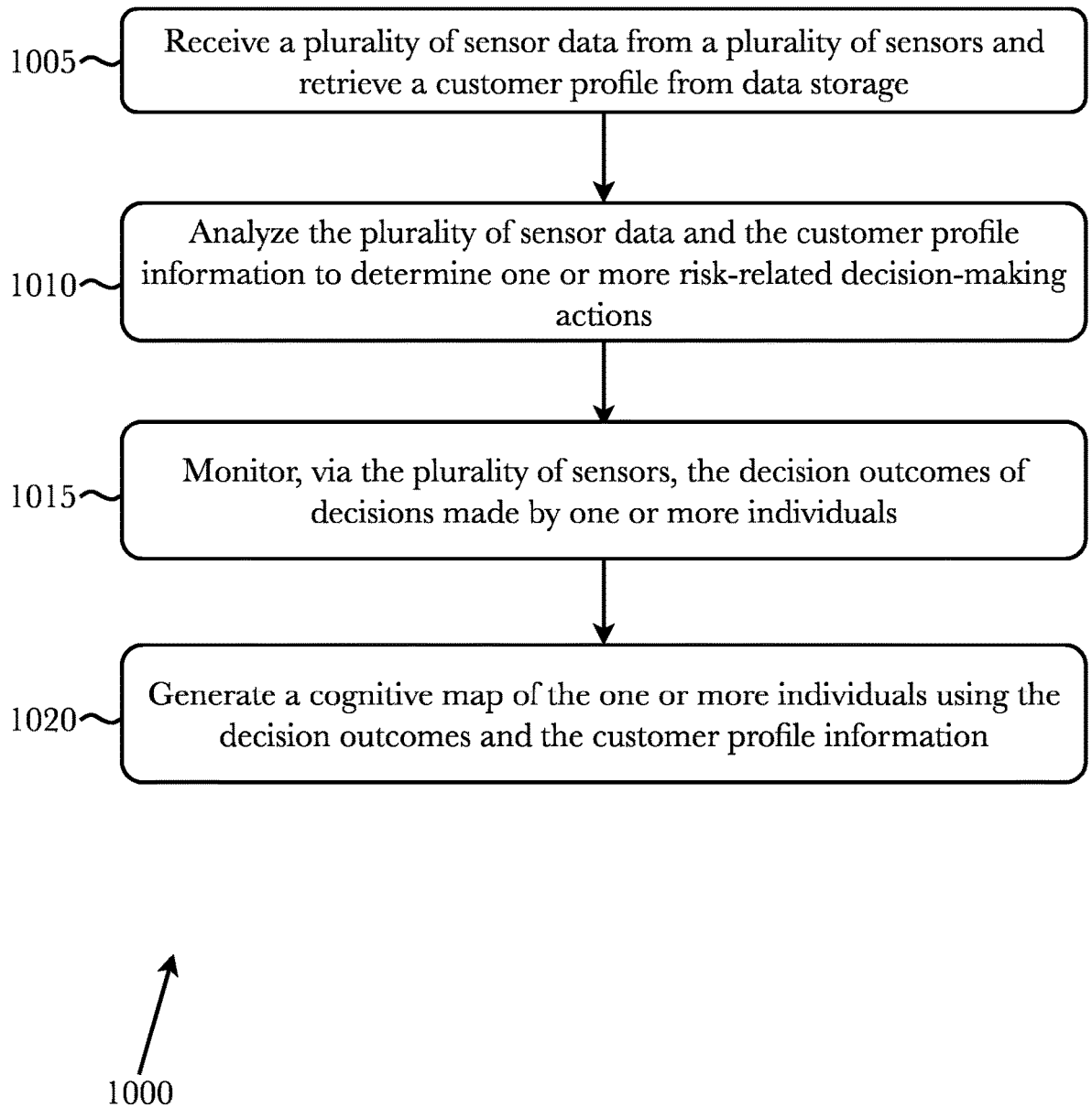
FIG. 10 is a method flow diagram illustrating an exemplary method for creating a cognitive map of an individual or group of individuals, according to some embodiments.

FIG. 10 is a method flow diagram illustrating an exemplary method 1000 for creating a cognitive map of an individual or group of individuals, according to some embodiments. According to an embodiment, the process 1000 begins when system 500 or one of its components, such as the data analysis module 600, receive a plurality of sensor data from a plurality of sensors and retrieves a customer profile from data storage (e.g., data store 112) 1005. Sensor data may include location information of an individual such as from a GPS device (e.g., GPS in a cell phone). The sensors may include smart wearable and/or portable devices such as smart phones, tablets, laptops and the like. For example, system 500 may receive bioinformatic data for an individual such as his heart rate during a traffic jam. Received sensor data may be formatted by data retrieval and storage module 505 and then persisted to data store 112 and/or MTSD 120. After data formatting (if necessary) and storage, data analysis module 600 may receive, retrieve, or otherwise obtain the plurality of sensor data and the customer profile information and then analyze this data to determine one or more risk-related decision making actions or processes 1010. In some embodiments, third party data related to an individual's decisions and/or decision making processes may be used to determine risk-related decision making actions of the individual. Determined decision making processes and actions may be stored for future use in the customer profile in data store 112. The next step is to monitor, via the plurality of sensors (and third party data), the decision outcomes of decisions made by one or more individuals 1015. The one or more individuals may include at least the individual associated with the retrieved customer profile. As a last step, data analysis module 600 and/or cognitive engine 620 may generate a cognitive map of the one or more individuals using the decision outcomes and the customer profile information 1020. In addition, cognitive map may include a risk propensity rating/score which can be used to classify the one or more individuals into risk groups. After creation of a cognitive map for an individual or group of individuals, the cognitive map may be used for various tasks by system 500. For example, the cognitive map and/or risk propensity rating may be used as a component for generating a risk rating of an insurance product and/or object, or the cognitive map may be combined with one or more activeness metrics to generate a cognitive density metric associated with an object and/or physical asset or location.

Figure 11:
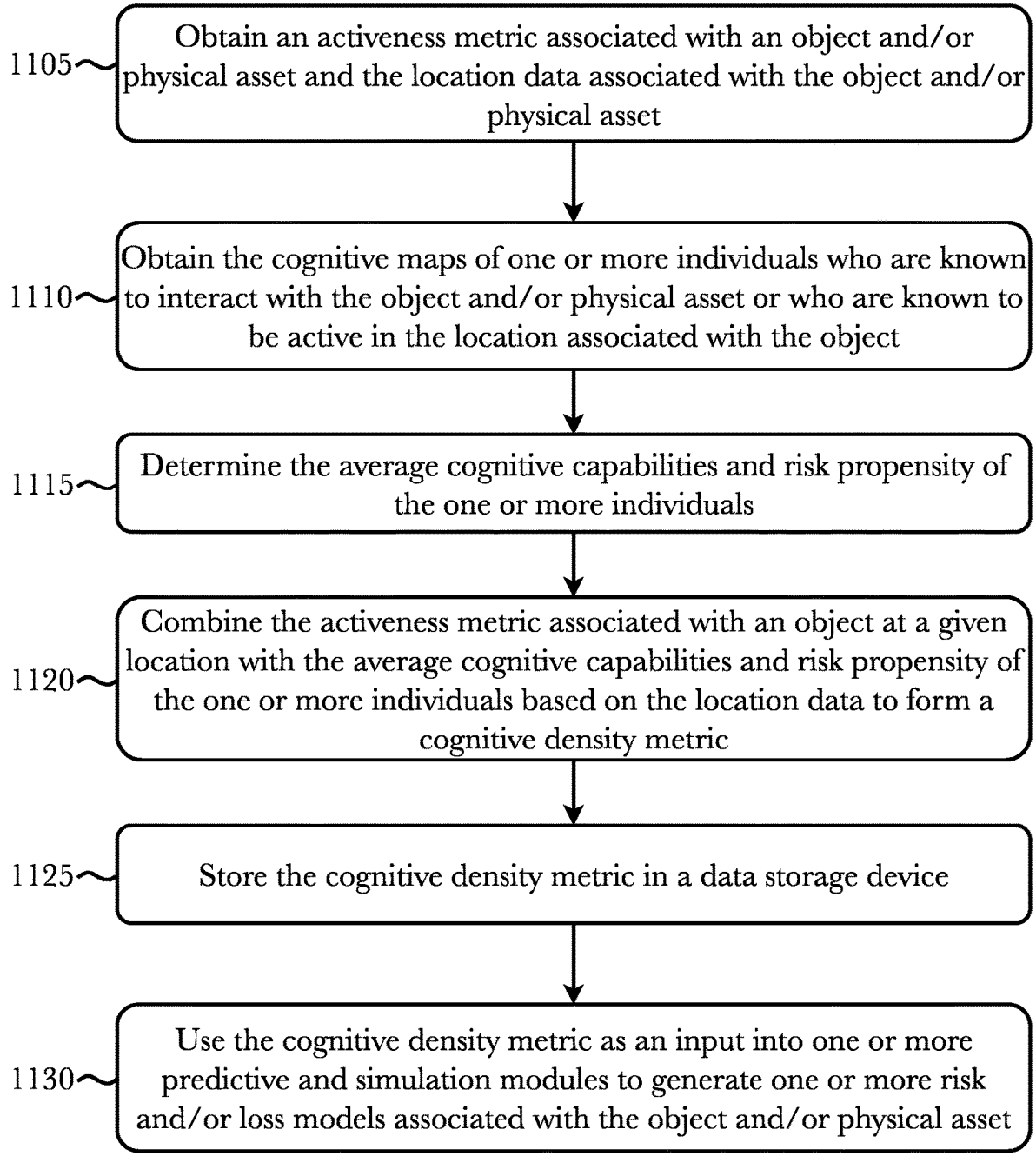
FIG. 11 is a method flow diagram illustrating an exemplary method for creating a cognitive density metric, according to some embodiments.

FIG. 11 is a method flow diagram illustrating an exemplary method 1100 for creating a cognitive density metric, according to some embodiments. According to an embodiment, the process 1100 begins when data analysis module 600 obtains an activeness metric associated with an object and/or physical asset and the location data associated with the object and/or physical asset 1105. The activeness metric may be obtained from activeness engine 610 or from data store 112. Locational data may also be obtained from data store 112. As a next step, data analysis module 600 obtains the cognitive maps of one or more individuals who are known to interact with the object and/or physical asset or who are known to be active in the location associated with the object 1110. Cognitive maps may be obtained from cognitive engine 620 or from data store 112 such as from an individual (e.g., customer) profile. Next, data analysis module 600 may determine the average cognitive capabilities and risk propensity of the one or more individuals 1115. According to an embodiment, this may be done by retrieved, analyzing, and aggregating the risk-related decision making processes and decision outcomes for a group of individuals in order to determine an average cognitive capability of the group of individuals. Data analysis module 600 may then combine the activeness metric associated with the object and/or physical asset at the location with the average cognitive capabilities and risk propensity of the one or more individuals based on the location data to form a cognitive density metric 1120. For example, the cognitive density metric may be used by predictive and simulation modules to generate various models that take into account the amount of people interacting with an object and/or physical asset and how those people may react to a given risk or loss event. Once the cognitive density metric has been created, it may be stored in a data storage device 1125 such as data store 112, and linked to the physical asset or object. As a last step, system 500 may use the cognitive density metric as an input into one or more predictive and simulation models to generate one or more risk and/or loss models associated with the object or physical asset 1130.

Hardware Architecture

Generally, the techniques disclosed herein may be implemented on hardware or a combination of software and hardware. For example, they may be implemented in an operating system kernel, in a separate user process, in a library package bound into network applications, on a specially constructed machine, on an application-specific integrated circuit (ASIC), or on a network interface card.

Software/hardware hybrid implementations of at least some of the embodiments disclosed herein may be implemented on a programmable network-resident machine (which should be understood to include intermittently connected network-aware machines) selectively activated or reconfigured by a computer program stored in memory. Such network devices may have multiple network interfaces that may be configured or designed to utilize different types of network communication protocols. A general architecture for some of these machines may be described herein in order to illustrate one or more exemplary means by which a given unit of functionality may be implemented. According to specific embodiments, at least some of the features or functionalities of the various embodiments disclosed herein may be implemented on one or more general-purpose computers associated with one or more networks, such as for example an end-user computer system, a client computer, a network server or other server system, a mobile computing device (e.g., tablet computing device, mobile phone, smartphone, laptop, or other appropriate computing device), a consumer electronic device, a music player, or any other suitable electronic device, router, switch, or other suitable device, or any combination thereof. In at least some embodiments, at least some of the features or functionalities of the various embodiments disclosed herein may be implemented in one or more virtualized computing environments (e.g., network computing clouds, virtual machines hosted on one or more physical computing machines, or other appropriate virtual environments).

Figure 12:
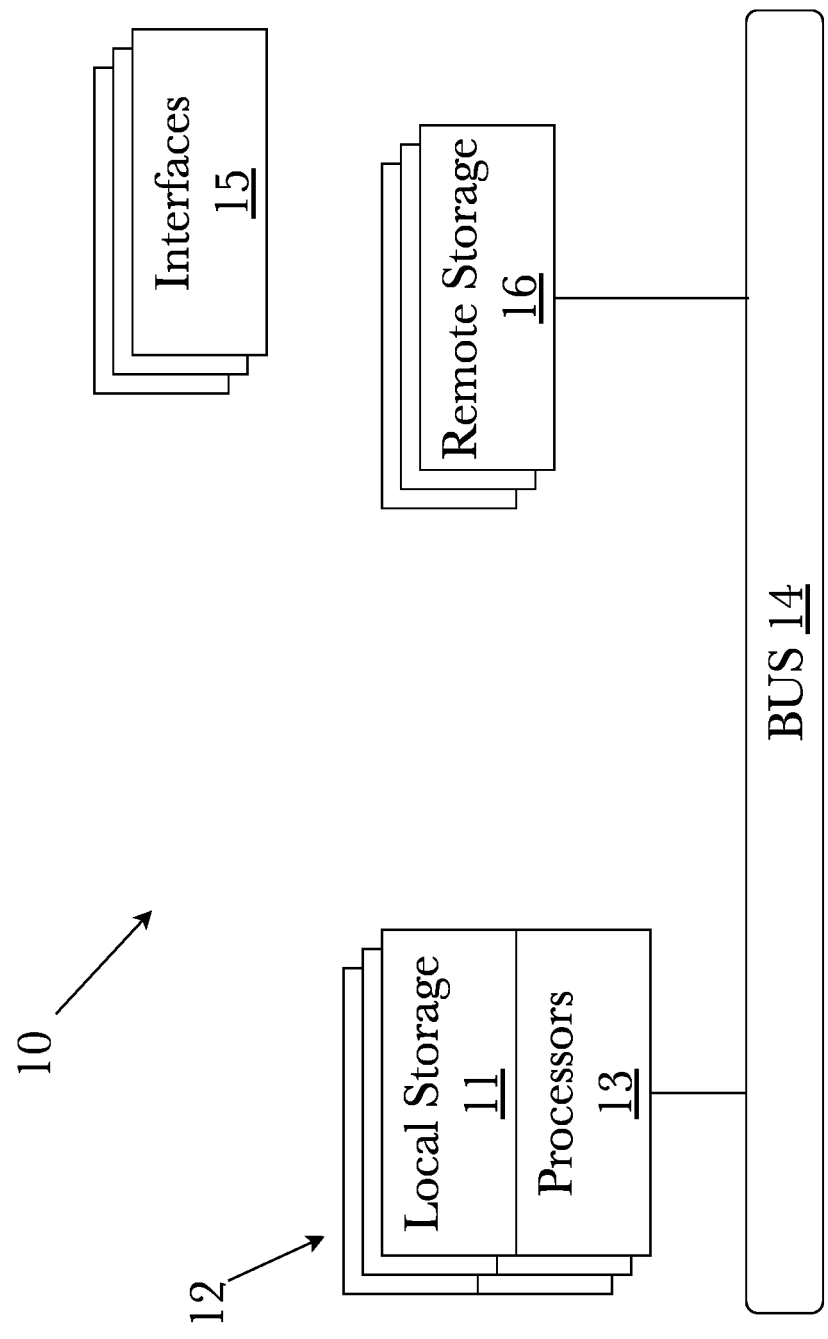
FIG. 12 is a block diagram illustrating an exemplary hardware architecture of a computing device used in various embodiments of the invention.

Referring now to FIG. 12 there is shown a block diagram depicting an exemplary computing device 10 suitable for implementing at least a portion of the features or functionalities disclosed herein. Computing device 10 may be, for example, any one of the computing machines listed in the previous paragraph, or indeed any other electronic device capable of executing software- or hardware-based instructions according to one or more programs stored in memory. Computing device 10 may be configured to communicate with a plurality of other computing devices, such as clients or servers, over communications networks such as a wide area network a metropolitan area network, a local area network, a wireless network, the Internet, or any other network, using known protocols for such communication, whether wireless or wired.

In one embodiment, computing device 10 includes one or more central processing units (CPU) 12, one or more interfaces 15, and one or more busses 14 (such as a peripheral component interconnect (PCI) bus). When acting under the control of appropriate software or firmware, CPU 12 may be responsible for implementing specific functions associated with the functions of a specifically configured computing device or machine. For example, in at least one embodiment, a computing device 10 may be configured or designed to function as a server system utilizing CPU 12, local memory 11 and/or remote memory 16, and interface(s) 15. In at least one embodiment, CPU 12 may be caused to perform one or more of the different types of functions and/or operations under the control of software modules or components, which for example, may include an operating system and any appropriate applications software, drivers, and the like.

CPU 12 may include one or more processors 13 such as, for example, a processor from one of the Intel, ARM, Qualcomm, and AMD families of microprocessors. In some embodiments, processors 13 may include specially designed hardware such as application-specific integrated circuits (ASICs), electrically erasable programmable read-only memories (EEPROMs), field-programmable gate arrays (FPGAs), and so forth, for controlling operations of computing device 10. In a specific embodiment, a local memory 11 (such as non-volatile random access memory (RAM) and/or read-only memory (ROM), including for example one or more levels of cached memory) may also form part of CPU 12. However, there are many different ways in which memory may be coupled to system 10. Memory 11 may be used for a variety of purposes such as, for example, caching and/or storing data, programming instructions, and the like. It should be further appreciated that CPU 12 may be one of a variety of system-on-a-chip (SOC) type hardware that may include additional hardware such as memory or graphics processing chips, such as a Qualcomm SNAPDRAGON™ or Samsung EXYNOS™ CPU as are becoming increasingly common in the art, such as for use in mobile devices or integrated devices.

As used herein, the term "processor" is not limited merely to those integrated circuits referred to in the art as a processor, a mobile processor, or a microprocessor, but broadly refers to a microcontroller, a microcomputer, a programmable logic controller, an application-specific integrated circuit, and any other programmable circuit.

In one embodiment, interfaces 15 are provided as network interface cards (NICs). Generally, NICs control the sending and receiving of data packets over a computer network; other types of interfaces 15 may for example support other peripherals used with computing device 10. Among the interfaces that may be provided are Ethernet interfaces, frame relay interfaces, cable interfaces, DSL interfaces, token ring interfaces, graphics interfaces, and the like. In addition, various types of interfaces may be provided such as, for example, universal serial bus (USB), Serial, Ethernet, FIREWIRE™, THUNDERBOLT™, PCI, parallel, radio frequency (RF), BLUETOOTH™, near-field communications (e.g., using near-field magnetics), 802.11 (WiFi), frame relay, TCP/IP, ISDN, fast Ethernet interfaces, Gigabit Ethernet interfaces, Serial ATA (SATA) or external SATA (ESATA) interfaces, high-definition multimedia interface (HDMI), digital visual interface (DVI), analog or digital audio interfaces, asynchronous transfer mode (ATM) interfaces, high-speed serial interface (HSSI) interfaces, Point of Sale (POS) interfaces, fiber data distributed interfaces (FDDIs), and the like. Generally, such interfaces 15 may include physical ports appropriate for communication with appropriate media. In some cases, they may also include an independent processor (such as a dedicated audio or video processor, as is common in the art for high-fidelity A/V hardware interfaces) and, in some instances, volatile and/or non-volatile memory (e.g., RAM).

Although the system shown and described above illustrates one specific architecture for a computing device 10 for implementing one or more of the inventions described herein, it is by no means the only device architecture on which at least a portion of the features and techniques described herein may be implemented. For example, architectures having one or any number of processors 13 may be used, and such processors 13 may be present in a single device or distributed among any number of devices. In one embodiment, a single processor 13 handles communications as well as routing computations, while in other embodiments a separate dedicated communications processor may be provided. In various embodiments, different types of features or functionalities may be implemented in a system according to the invention that includes a client device (such as a tablet device or smartphone running client software) and server systems (such as a server system described in more detail below).

Regardless of network device configuration, the system of the present invention may employ one or more memories or memory modules (such as, for example, remote memory block 16 and local memory 11) configured to store data, program instructions for the general-purpose network operations, or other information relating to the functionality of the embodiments described herein (or any combinations of the above). Program instructions may control execution of or comprise an operating system and/or one or more applications, for example. Memory 16 or memories 11, 16 may also be configured to store data structures, configuration data, encryption data, historical system operations information, or any other specific or generic non-program information described herein.

Because such information and program instructions may be employed to implement one or more systems or methods described herein, at least some network device embodiments may include nontransitory machine-readable storage media, which, for example, may be configured or designed to store program instructions, state information, and the like for performing various operations described herein. Examples of such nontransitory machine-readable storage media include, but are not limited to, magnetic media such as hard disks, floppy disks, and magnetic tape; optical media such as CD-ROM disks; magneto-optical media such as optical disks, and hardware devices that are specially configured to store and perform program instructions, such as read-only memory devices (ROM), flash memory (as is common in mobile devices and integrated systems), solid state drives (SSD) and "hybrid SSD" storage drives that may combine physical components of solid state and hard disk drives in a single hardware device (as are becoming increasingly common in the art with regard to personal computers), memristor memory, random access memory (RAM), and the like. It should be appreciated that such storage means may be integral and non-removable (such as RAM hardware modules that may be soldered onto a motherboard or otherwise integrated into an electronic device), or they may be removable such as swappable flash memory modules (such as "thumb drives" or other removable media designed for rapidly exchanging physical storage devices), "hot-swappable" hard disk drives or solid state drives, removable optical storage discs, or other such removable media, and that such integral and removable storage media may be utilized interchangeably. Examples of program instructions include both object code, such as may be produced by a compiler, machine code, such as may be produced by an assembler or a linker, byte code, such as may be generated by for example a JAVA™ compiler and may be executed using a Java virtual machine or equivalent, or files containing higher level code that may be executed by the computer using an interpreter (for example, scripts written in Python, Perl, Ruby, Groovy, or any other scripting language).

Figure 13:
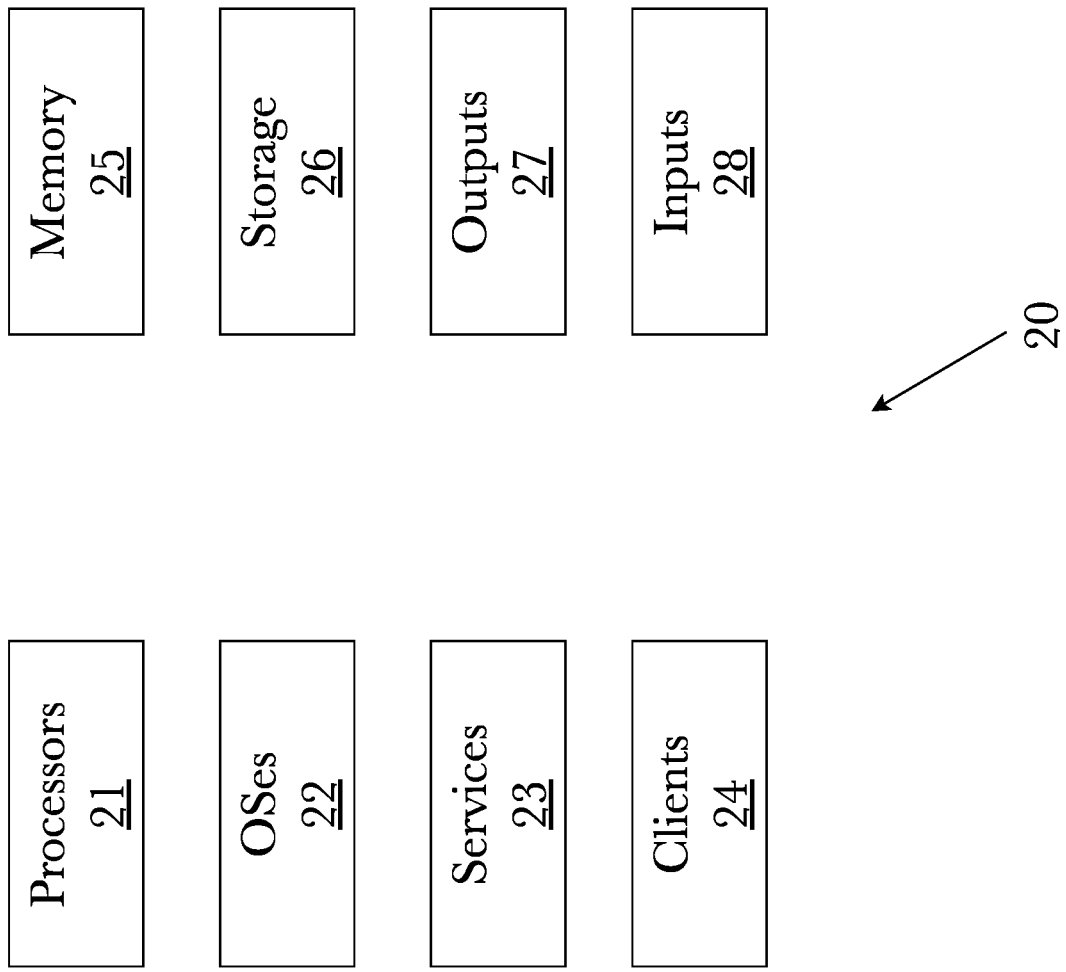
FIG. 13 is a block diagram illustrating an exemplary logical architecture for a client device, according to various embodiments of the invention.

In some embodiments, systems according to the present invention may be implemented on a standalone computing system. Referring now to FIG. 13, there is shown a block diagram depicting a typical exemplary architecture of one or more embodiments or components thereof on a standalone computing system. Computing device 20 includes processors 21 that may run software that carry out one or more functions or applications of embodiments of the invention, such as for example a client application 24. Processors 21 may carry out computing instructions under control of an operating system 22 such as, for example, a version of Microsoft's WINDOWS™ operating system, Apple's Mac OS/X or iOS operating systems, some variety of the Linux operating system, Google's ANDROID™ operating system, or the like. In many cases, one or more shared services 23 may be operable in system 20, and may be useful for providing common services to client applications 24. Services 23 may for example be WINDOWS™ services, user-space common services in a Linux environment, or any other type of common service architecture used with operating system 21. Input devices 28 may be of any type suitable for receiving user input, including for example a keyboard, touchscreen, microphone (for example, for voice input), mouse, touchpad, trackball, or any combination thereof. Output devices 27 may be of any type suitable for providing output to one or more users, whether remote or local to system 20, and may include for example one or more screens for visual output, speakers, printers, or any combination thereof. Memory 25 may be random-access memory having any structure and architecture known in the art, for use by processors 21, for example to run software. Storage devices 26 may be any magnetic, optical, mechanical, memristor, or electrical storage device for storage of data in digital form (such as those described above). Examples of storage devices 26 include flash memory, magnetic hard drive, CD-ROM, and/or the like.

Figure 14:
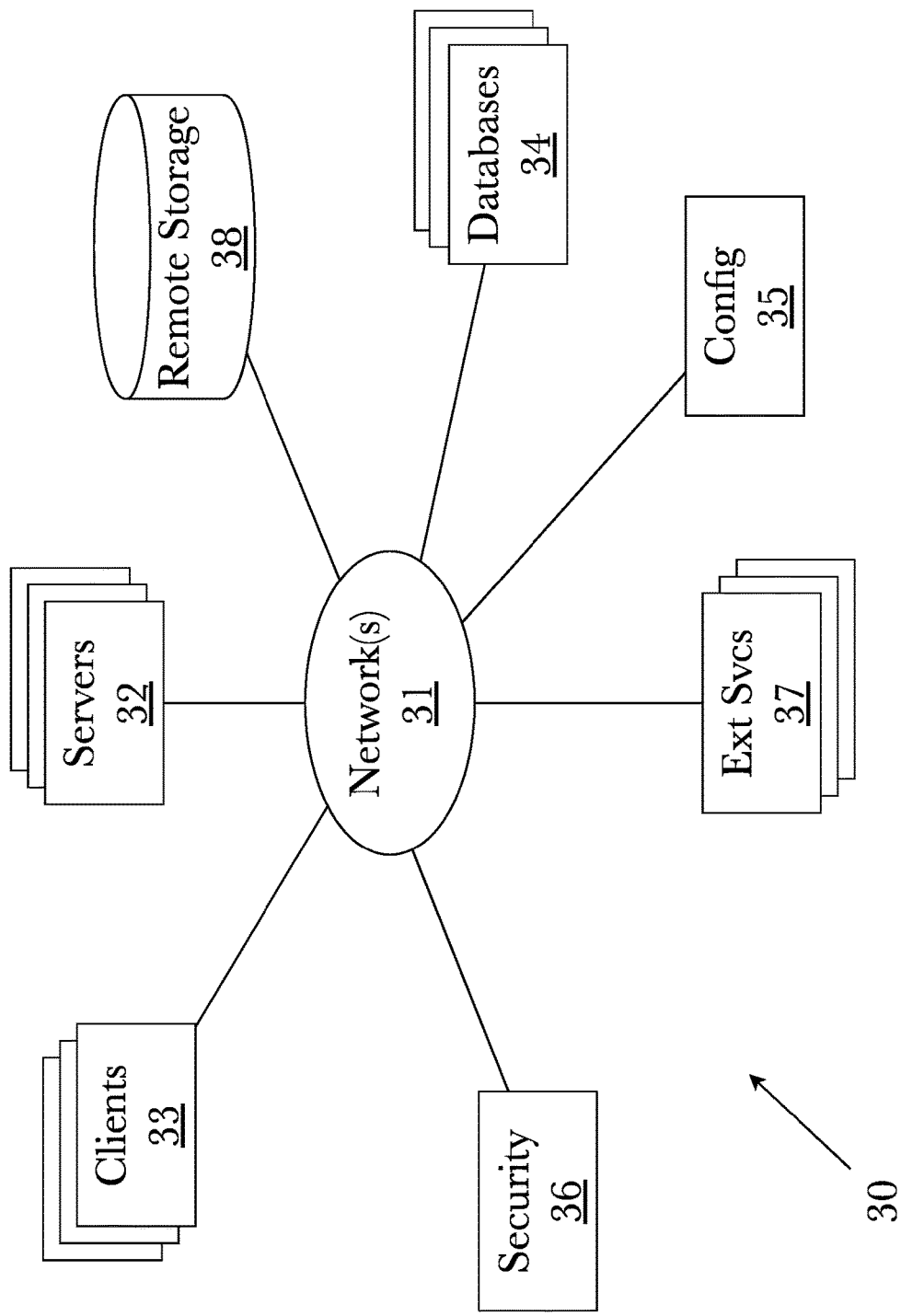
FIG. 14 is a block diagram illustrating an exemplary architectural arrangement of clients, servers, and external services, according to various embodiments of the invention.

In some embodiments, systems of the present invention may be implemented on a distributed computing network, such as one having any number of clients and/or servers. Referring now to FIG. 14, there is shown a block diagram depicting an exemplary architecture 30 for implementing at least a portion of a system according to an embodiment of the invention on a distributed computing network. According to the embodiment, any number of clients 33 may be provided. Each client 33 may run software for implementing client-side portions of the present invention; clients may comprise a system 20 such as that illustrated above. In addition, any number of servers 32 may be provided for handling requests received from one or more clients 33. Clients 33 and servers 32 may communicate with one another via one or more electronic networks 31, which may be in various embodiments any of the Internet, a wide area network, a mobile telephony network (such as CDMA or GSM cellular networks), a wireless network (such as WiFi, Wimax, LTE, and so forth), or a local area network (or indeed any network topology known in the art; the invention does not prefer any one network topology over any other).

Networks 31 may be implemented using any known network protocols, including for example wired and/or wireless protocols.

In addition, in some embodiments, servers 32 may call external services 37 when needed to obtain additional information, or to refer to additional data concerning a particular call. Communications with external services 37 may take place, for example, via one or more networks 31. In various embodiments, external services 37 may comprise web-enabled services or functionality related to or installed on the hardware device itself. For example, in an embodiment where client applications 24 are implemented on a smartphone or other electronic device, client applications 24 may obtain information stored in a server system 32 in the cloud or on an external service 37 deployed on one or more of a particular enterprise's or user's premises.

In some embodiments of the invention, clients 33 or servers 32 (or both) may make use of one or more specialized services or appliances that may be deployed locally or remotely across one or more networks 31. For example, one or more databases 34 may be used or referred to by one or more embodiments of the invention. It should be understood by one having ordinary skill in the art that databases 34 may be arranged in a wide variety of architectures and using a wide variety of data access and manipulation means. For example, in various embodiments one or more databases 34 may comprise a relational database system using a structured query language (SQL), while others may comprise an alternative data storage technology such as those referred to in the art as "NoSQL" (for example, Hadoop Cassandra, Google BigTable, and so forth). In some embodiments, variant database architectures such as column-oriented databases, in-memory databases, clustered databases, distributed databases, or even flat file data repositories may be used according to the invention. It will be appreciated by one having ordinary skill in the art that any combination of known or future database technologies may be used as appropriate, unless a specific database technology or a specific arrangement of components is specified for a particular embodiment herein. Moreover, it should be appreciated that the term "database" as used herein may refer to a physical database machine, a cluster of machines acting as a single database system, or a logical database within an overall database management system. Unless a specific meaning is specified for a given use of the term "database", it should be construed to mean any of these senses of the word, all of which are understood as a plain meaning of the term "database" by those having ordinary skill in the art.

Similarly, most embodiments of the invention may make use of one or more security systems 36 and configuration systems 35. Security and configuration management are common information technology (IT) and web functions, and some amount of each are generally associated with any IT or web systems. It should be understood by one having ordinary skill in the art that any configuration or security subsystems known in the art now or in the future may be used in conjunction with embodiments of the invention without limitation, unless a specific security 36 or configuration system 35 or approach is specifically required by the description of any specific embodiment.

Figure 15:
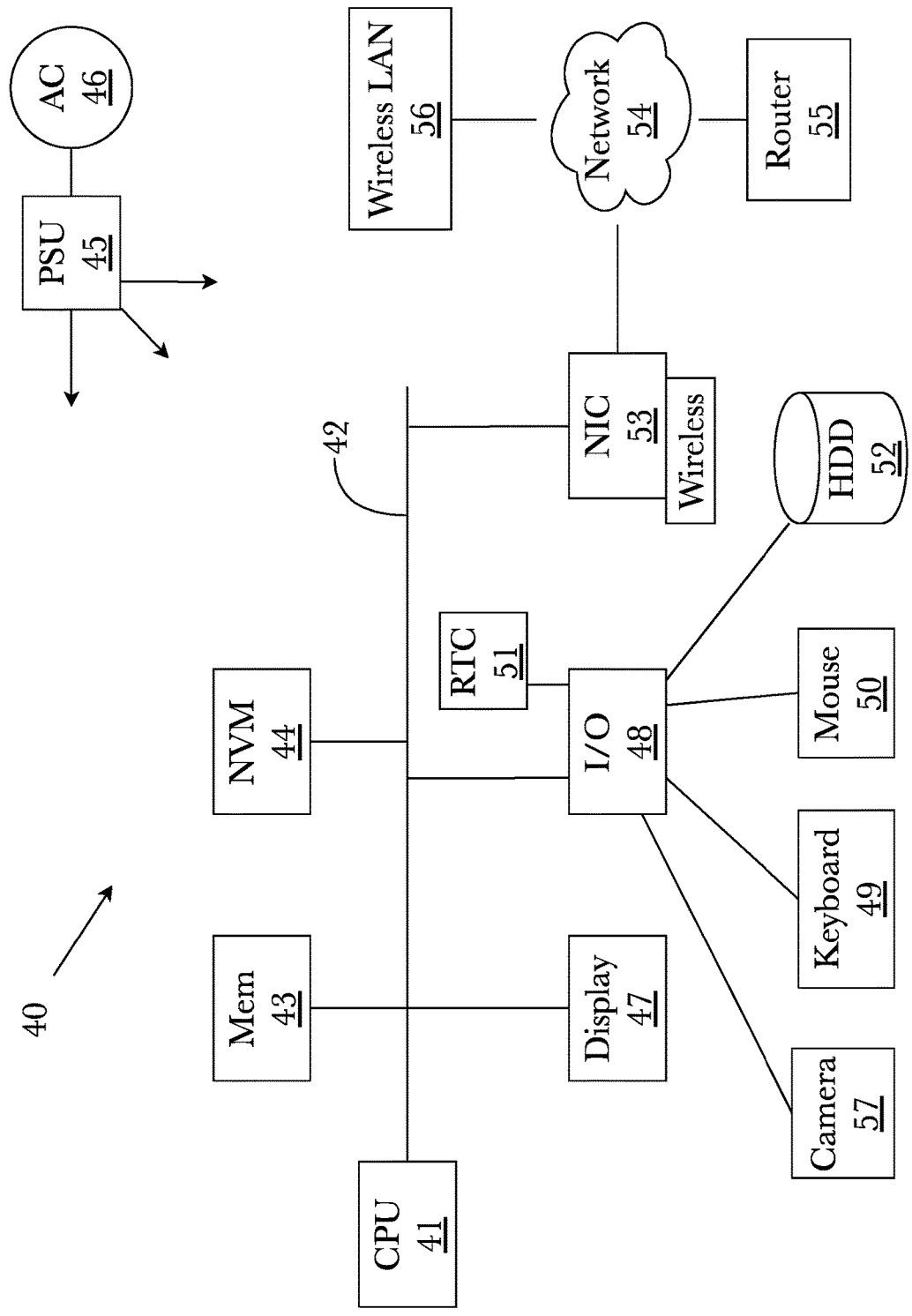
FIG. 15 is another block diagram illustrating an exemplary hardware architecture of a computing device used in various embodiments of the invention.

FIG. 15 shows an exemplary overview of a computer system 40 as may be used in any of the various locations throughout the system. It is exemplary of any computer that may execute code to process data. Various modifications and changes may be made to computer system 40 without departing from the broader scope of the system and method disclosed herein. Central processor unit (CPU) 41 is connected to bus 42, to which bus is also connected memory 43, nonvolatile memory 44, display 47, input/output (I/O) unit 48, and network interface card (NIC) 53. I/O unit 48 may, typically, be connected to peripherals such as a keyboard 49, pointing device 50, hard disk 52, real-time clock 51, a camera 57, and other peripheral devices. NIC 53 connects to network 54, which may be the Internet or a local network, which local network may or may not have connections to the Internet. The system may be connected to other computing devices through the network via a router 55, wireless local area network 56, or any other network connection. Also shown as part of system 40 is power supply unit 45 connected, in this example, to a main alternating current (AC) supply 46. Not shown are batteries that could be present, and many other devices and modifications that are well known but are not applicable to the specific novel functions of the current system and method disclosed herein. It should be appreciated that some or all components illustrated may be combined, such as in various integrated applications, for example Qualcomm or Samsung system-on-a-chip (SOC) devices, or whenever it may be appropriate to combine multiple capabilities or functions into a single hardware device (for instance, in mobile devices such as smartphones, video game consoles, in-vehicle computer systems such as navigation or multimedia systems in automobiles, or other integrated hardware devices).

The advanced insurance management and decision platform described herein is built upon highly programmable computer software architecture that may serve as the basis of a plurality of specific use systems. For example the architecture and base programming described here 100 being employed as an insurance decision platform 200 and advanced insurance management platform 500 is the same computer architecture described in ¶032 and ¶033 of co-pending application Ser. No. 15/237,625 and specifically used as a cyber-attack detection mitigation and remediation platform in ¶035 through ¶037 of co-pending application Ser. No. 15/237,625. The same base architecture and programming, presented here and previously and designed to be readily augmented by application specific data stores and programming may take on the capabilities or personalities of a plurality of highly advanced platforms in a plurality of fields both business and scientific where large volumes of data, at least a portion of which may enter the system in bursts or at irregular times is present and data which may need normalization and transformation as well as correlation of possibly hard to discern commonalities. The personality instilled platform may also be used in these fields to perform reliable analytics and run reliable simulations on the existing data to allow operators to intelligently determine next direction to implement (and which next direction potentially not to implement) potentially saving both time, money and resources. In summary, the business operating system disclosed here and in co-pending applications may be imagined more as a set of software engineered stations in a highly and readily modifiable virtual production line than as only a cyber-attack detection, mitigation and remediation system or as only an insurance decision platform as it is both and can be more.

In various embodiments, functionality for implementing systems or methods of the present invention may be distributed among any number of client and/or server components. For example, various software modules may be implemented for performing various functions in connection with the present invention, and such modules may be variously implemented to run on server and/or client.

The skilled person will be aware of a range of possible modifications of the various embodiments described above. Accordingly, the present invention is defined by the claims and their equivalents.

What is claimed is:

1. A system for risk quantification for insurance process management employing an advanced insurance management and decision platform comprising:
   a high-speed data retrieval and storage module stored in a memory of and operating on a processor of a computing device and configured to:
      retrieve, via network interface, a plurality of insurance contract underwriting terms pertaining to a physical asset from a plurality of data sources;
      extract and identify, using a scalable expressively scriptable connection interface, a plurality of risks associated with the physical asset based on the plurality of underwriting terms;
      quantify a magnitude of each of the plurality of identified risks associated with the physical asset using real-time environmental data; and
      identify an upcoming risk event in the geographical location of the physical asset; and
   a data analysis module stored in a memory of and operating on the processor of the computing device and configured to:
      receive, via real-time data connections, a plurality of first sensor data pertaining to the physical asset and a plurality of second sensor data pertaining to one or more individuals;
      extract location data pertaining to the physical asset from the plurality of first sensor data by parsing location-specific components of telemetry signals;
      analyze the plurality of first sensor data to determine an activeness metric of the physical asset, wherein the activeness metric comprises at least one of a measure of density, a measure of interaction frequency, and a measure of traffic associated with the physical asset;
      retrieve an individual profile associated with the one or more individuals from a graph-based information storage service;
      create a cognitive map based at least on the plurality of second sensor data and the individual profile, wherein the cognitive map comprises one or more risk-related decision making processes, wherein the cognitive map represents cognitive information as data sets stored in the memory;
      assign a risk propensity score using the one or more specific risk-related decision making processes by applying decision-specific heuristic analysis;
      combine, using a specialized data transformation pipeline, the activeness metric and the risk-propensity score based on the location data to produce a cognitive density metric associated with the physical asset or the location of the physical asset, wherein the cognitive density metric provides a technical representation of risk that cannot be calculated through conventional risk assessment; and
      send the cognitive density metric to a predictive analytics module; and
   the predictive analytics module stored in a memory of and operating on the processor of the computing device and configured to:
      receive the cognitive density metric;
      generate, using information theory-based predictive statistics functions and machine learning algorithms, a vulnerability model that relates the insurance contract underwriting terms, the magnitude of the plurality of risks, and the cognitive density metric to determine a risk response of the physical asset to the plurality of risks; and apply the upcoming risk event to the determined risk response to predict a loss associated with the physical asset; and a predictive simulation module stored in a memory of and operating on the processor of the computing device and configured to:

generate a blended exposures and losses model using discrete event simulator programming configured to analyze concentration of losses in terms of time, location, and cognitive density;

generate synthetic data through a generative adversarial network based on the magnitude of each of the plurality of risks and the predicted loss associated with the physical asset, wherein the generative adversarial network comprises a generator model and a discriminator model operating in a feedback loop to create high-quality synthetic data; and pass the synthetic data through the blended exposures and losses model to determine a concentrated risk of loss associated with a plurality of assets of the same type as the physical asset.

2. The system of claim 1, wherein at least one predictive simulation algorithm of the discrete event simulator programming performs historical simulations based on actual loss data.

3. The system of claim 2, wherein at least one of the plurality of risks is geo-political conditions at one or more sites of client business operation.

4. The system of claim 1, wherein the individual profile comprises contextual information, cognitive information, demographic information, socioeconomic information, insured assets, insurance policy information, and location information.

5. The system of claim 4, wherein the location information is determined or inferred from historical location data of one or more individuals.

6. The system of claim 4, wherein the location information is determined from mobile devices and smart wearables.

7. A method for risk quantification for insurance process management employing an advanced insurance management and decision platform, the method comprising the steps of:

retrieving, via a network interface, a plurality of insurance contract underwriting terms pertaining to a physical asset from a plurality of data sources;

extracting and identifying, using a scalable expressively scriptable connection interface, a plurality of risks associated with the physical asset based on the plurality of underwriting terms;

quantifying a magnitude of each of the plurality of identified risks associated with the physical asset using real-time environmental data;

identifying an upcoming risk event in the geographical location of the physical asset;

receiving, via real-time data connections, a plurality of first senor data pertaining to the physical asset and a plurality of second sensor data pertaining to one or more individuals' data;

extracting location data pertaining to the physical asset from the plurality of first sensor data by parsing location-specific components of telemetry signals;

analyzing the plurality first sensor data to determine an activeness metric of the physical asset, wherein the activeness metric comprises at least one of a measure of density, a measure of interaction frequency, and a measure of traffic associated with the physical asset;

retrieving an individual profile associated with the one or more individuals from a graph-based information storage service;

creating a cognitive map based at least on the plurality of second sensor data and the individual profile wherein the cognitive map comprises one or more risk-related decision making processes, wherein the cognitive map represents cognitive information as data sets stored in the memory;

assigning a risk propensity score using the one or more specific risk-related decision making processes by applying decision-specific heuristic analysis;

combining, using a specialized data transformation pipeline, the activeness metric and the risk-propensity score based on the location data to produce a cognitive density metric associated with the physical asset or the location of the physical asset, wherein the cognitive density metric provides a technical representation of risk that cannot be calculated through conventional risk assessment;

generating, using information theory-based predictive statistics functions and machine learning algorithms a vulnerability model that relates the insurance contract underwriting terms, the magnitude of the plurality of risks, and the cognitive density metric to determine a risk response of the physical assets to the plurality of risks;

applying the upcoming risk event to the determined risk response to predict a loss associated with the physical asset;

generating a blended exposures and losses model using discrete event simulator programming configured to analyze concentration of losses in terms of time, location, and cognitive density;

generating synthetic data through a generative adversarial network based on the magnitude of each of the plurality of risks and the predicted loss associated with the physical asset, wherein the generative adversarial network comprises a generator model and a discriminator model operating in a feedback loop to create high-quality synthetic data; and passing the synthetic data through the blended exposures and losses model to determine a concentrated risk of loss associated with a plurality of assets of the same type as the physical asset.

8. The method of claim 7, wherein at least one predictive simulation algorithm of the discrete event simulator programming performs historical simulations based on actual loss data.

9. The method of claim 8, wherein at least one of the plurality of risks is geo-political conditions at one or more sites of client business operation.

10. The method of claim 7, wherein the individual profile comprises contextual information, cognitive information, demographic information, socioeconomic information, insured assets, insurance policy information, and location information.

11. The method of claim 10, wherein the location information is determined or inferred from historical location data of one or more individuals.

12. The method of claim 10, wherein the location information is determined from mobile devices and smart wearables.

* * * * *